(12) United States Patent
Rao et al.

(10) Patent No.: US 11,239,008 B2
(45) Date of Patent: Feb. 1, 2022

(54) RESISTORS FOR DYNAMIC BRAKING

(71) Applicant: Transportation IP Holdings, LLC, Norwalk, CT (US)

(72) Inventors: Sudeep Pradhan Sadananda Rao, Bangalore (IN); Jaime Garcia, Lawrence Park, PA (US); Mahantesh Hosur, Bangalore (IN); Jeffrey John Wolff, Erie, PA (US); Laura Cooper, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 16/856,503

(22) Filed: Apr. 23, 2020

(65) Prior Publication Data

US 2020/0251259 A1 Aug. 6, 2020

Related U.S. Application Data

(62) Division of application No. 16/193,717, filed on Nov. 16, 2018, now Pat. No. 10,665,369.

(51) Int. Cl.
| | |
|---|---|
| *H01C 1/08* | (2006.01) |
| *H01C 13/02* | (2006.01) |
| *H01C 7/00* | (2006.01) |
| *B60L 7/06* | (2006.01) |
| *H01C 17/00* | (2006.01) |
| *B61H 11/00* | (2006.01) |

(52) U.S. Cl.
CPC ............... *H01C 1/08* (2013.01); *B60L 7/06* (2013.01); *H01C 7/00* (2013.01); *H01C 13/02* (2013.01); *H01C 17/00* (2013.01); *B60L 2200/26* (2013.01); *B61H 11/00* (2013.01)

(58) Field of Classification Search
CPC . H01C 1/08; H01C 7/00; H01C 13/02; H01C 17/00; B60L 7/06; B60L 2200/26
See application file for complete search history.

(56) References Cited

U.S. PATENT DOCUMENTS

| | | | | |
|---|---|---|---|---|
| 3,274,374 | A * | 9/1966 | Clune | H05B 3/24 219/426 |
| 4,238,636 | A * | 12/1980 | Burstrom | H05B 3/64 338/282 |
| 5,396,214 | A * | 3/1995 | Kumar | B60L 9/005 338/279 |
| 5,917,404 | A * | 6/1999 | Campbell | H01C 3/10 338/315 |

(Continued)

FOREIGN PATENT DOCUMENTS

WO    WO-0154221 A1 *  7/2001  ............. H01P 3/085

*Primary Examiner* — Kyung S Lee
(74) *Attorney, Agent, or Firm* — The Small Patent Law Group LLC; Philip S. Hof

(57) ABSTRACT

A resistor includes an elongated cylindrical body having nodes and elongated members. The elongated members interconnect the nodes to form openings between the nodes and the elongated members for the flow therethrough of a cooling fluid. The body is configured to receive electric current from a powered system and to conduct and provide electric resistance to the electric current to dissipate at least part of the electric current as heat from the body. The body also is configured to be coupled with at least one other resistor of the powered system in one or more of a parallel or series arrangement in an electric circuit.

20 Claims, 18 Drawing Sheets

(56) References Cited

U.S. PATENT DOCUMENTS

| | | | |
|---|---|---|---|
| 9,815,374 B2* | 11/2017 | Widmer | B60L 7/02 |
| 2002/0074210 A1* | 6/2002 | Brandle | G07D 3/06 |
| | | | 194/334 |
| 2002/0140615 A1* | 10/2002 | Carles | H01Q 1/38 |
| | | | 343/725 |
| 2008/0080137 A1* | 4/2008 | Otsuki | H01L 23/3672 |
| | | | 361/697 |
| 2013/0154523 A1* | 6/2013 | Brown | B60L 50/61 |
| | | | 318/376 |
| 2019/0021186 A1* | 1/2019 | Poltorak | H01L 23/367 |

* cited by examiner

RESISTORS FOR DYNAMIC BRAKING

CROSS-REFERENCE TO RELATED APPLICATIONS

This application is a divisional of U.S. patent application Ser. No. 16/193,717, which was filed on 16 Nov. 2018, and the entire disclosure of which is incorporated herein by reference.

FIELD

The subject matter described herein relates to electrical resistors, such as resistors that can be used to dissipate electric current generated by a braking system as heat or that can be used for power generation and/or transmission.

BACKGROUND

Locomotives and other powered systems may use resistors for a variety of purposes. Some braking systems generate electric current during operation. For example, regenerative or dynamic braking systems may create electric current during braking. This current may be conducted to a grid of resistors conductively connected with each other. The resistors dissipate the electric current as heat. Blowers (e.g., fans) may be used to cool the resistors and carry the heat generated by the resistors away from the resistor grid. Some stationary power-generating systems may use resistors in the transmission of current between locations.

One problem with some known resistors is that the resistors are limited in how much heat the resistors can dissipate. The resistors usually are manufactured as planar or flat plates to increase the exposure of the surface area of the resistors to the ambient environment. This helps to cool the resistors by carrying heat from the surfaces of the resistors that is generated as electric current is conducted through the resistors.

But, increasing the surface areas of the resistors even further would increase the heat that can be dissipated by the resistors. This can increase the capacity of the resistors to dissipate current generated by the powered systems.

BRIEF DESCRIPTION

In one or more embodiments, a resistor is provided that includes an elongated cylindrical body having nodes and elongated members. The elongated members interconnect the nodes to form openings between the nodes and the elongated members for the flow therethrough of a cooling fluid. The body is configured to receive electric current from a powered system and to conduct and provide electric resistance to the electric current to dissipate at least part of the electric current as heat from the body. The body also is configured to be coupled with at least one other resistor of the powered system in one or more of a parallel or series arrangement in an electric circuit.

In one or more embodiments, a method for manufacturing a resistor is provided that includes successively applying layers of material on each other. Each of the layers forms a cross-sectional shape of a three-dimensional resistor body. The method also includes fusing adjacent layers of the layers that are successively applied with each other to form the resistor body. The adjacent layers are fused together to form the resistor body that has an elongated cylindrical shape. The adjacent layers are fused together to form the resistor body that is shaped to receive and dissipate electric current from a powered system as heat from the resistor body. The resistor body is shaped to be coupled with at least one other resistor of the powered system in one or more of a parallel or series arrangement in an electric circuit.

In one or more embodiments, a resistor is provided that includes an elongated cylindrical body that extends along a center axis from a first terminal end to an opposite, second terminal end. The body has elongated members interconnected to one another at nodes and forms openings between the nodes and the elongated members for flow therethrough of a cooling fluid. The body forms a continuous electrically conductive path that extends from the first terminal end to the second terminal end. The body is configured to receive electric current at the first terminal end from a powered system and to conduct and provide electric resistance to the electric current to dissipate at least part of the electric current as heat from the body. The second terminal end of the body is configured to be coupled with at least one other resistor of the powered system in one or more of a parallel or series arrangement in an electric circuit.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
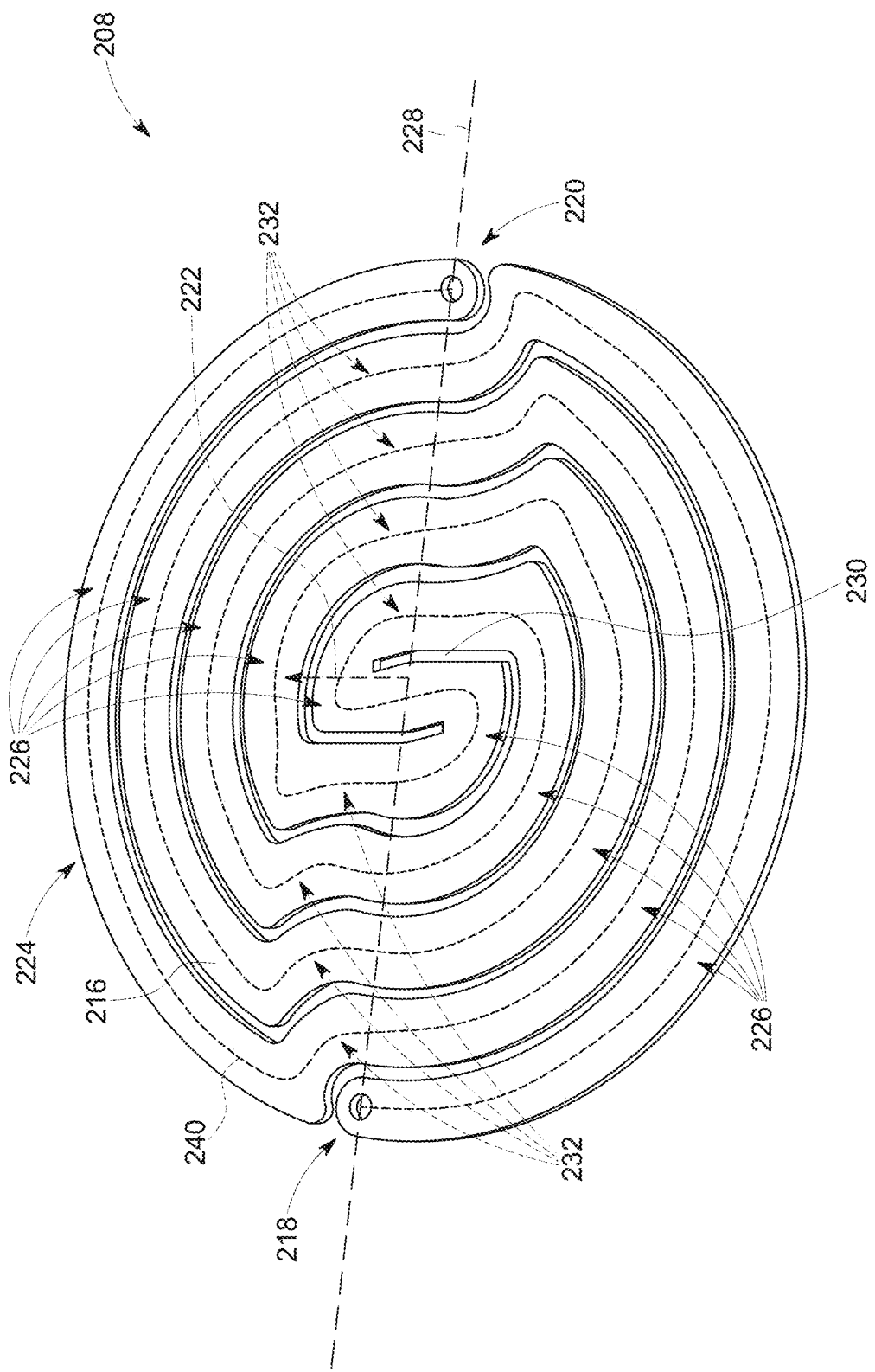
FIG. 1 illustrates one example of an asymmetric disc-shaped resistor.

One or more embodiments of the inventive subject matter described herein provide for resistors having increased capacity for dissipating heat due to increased surface areas of the resistors. This can allow for the resistors to conduct and dissipate increased amounts of current from a powered system, such as a braking system or power-generating system, relative to other types of resistors. The resistors described herein can be additively manufactured using direct metal laser sintering of powder beds, direct metal laser melting of powder beds, powder fed or binder jetting or atomic diffusion, fused deposition modeling or selective laser sintering or electron beam melting, wire fed printing, sheet lamination 3D printing, cold-spray-based 3D printing, or a combination of the above additive manufacturing technologies. Optionally, a combination of subtractive substrate manufacturing with additive manufacturing deposition can be used to make the complex shapes of the resistors described herein. The resistors can be manufactured from ceramic materials, metal, or metal alloy materials, such as INCONEL718/625, other nickel alloys, other nickel-based super alloys, or other metal alloys, alone or in combination with organic or in-organic binders or materials.

The additively manufactured resistors can be designed for higher surface area per given volume and for customized air flows through and/or around the resistors using one or more motorized fans or blowers. The designs of the additively manufactured resistors described herein can be more effectively cooled than currently known solid planar resistors with the same air flow. This can increase the useful life of the resistors and increase the reliability of the resistors with reduced weight and space savings of the resistors relative to known resistors.

The resistors described herein can be connected with each other in a circuit that conducts current through at least some of the resistors. The resistors can be connected with each other in a series and/or in a parallel arrangement. For example, some resistors can be connected in series with each other, some resistors can be connected in parallel with each other, and some series of resistors can be connected in parallel with each other. The parallel connection of the resistors can allow for electric current to continue passing through some resistors if other resistors fail or the connections to those resistors break.

One example of an assembly in which the resistors described herein can be used is a resistor grid of a powered system. The resistor grid includes several resistor modules that each includes several grid resistors electrically connected in series with each other. A blower is oriented toward the resistors in each module with a diffuser disposed between each blower and the resistors in the same module. The blower forces air through the diffuser, which diffuses the air over the resistors to cool and dissipate heat given off by the resistors. This air is a cooling fluid used to cool the resistors. As described herein, the resistors can generate heat as current is conducted through the resistors from a powered system, such as a braking system, a power-generating system (e.g., a turbine), or the like. Alternatively, the resistors can be connected to the powered system in another way, such as by one or more cables. The resistors may be placed in a conductive path along which the powered system conducts current, such as to one or more loads to power the loads. While air is one cooling fluid that may pass over and/or through the resistors to cool the resistors, optionally, another type of cooling fluid can be used. For example, the cooling fluid can be water, oil, nitrogen, or the like.

FIG. 1 illustrates one example of a resistor 208. The resistor 208 is formed from an elongated body 216 that extends from a first terminal end 218 to an opposite terminal end 220. The body 216 is a continuous body from the end 218 to the end 220, without gaps, breaks, or the like, in the body 216. Alternatively, the body 216 can be formed from two or more segments that are joined together. The body 216 can be formed from a resistive material that resists the conduction of current from the end 218 to the end 220, but that is at least partially conductive to current from the end 218 to the end 220. The end 218 and/or the end 220 can be conductively coupled with a powered system, another resistor, and/or another element in a circuit. Alternatively, the end 220 can be conductively coupled with the powered system, another resistor, and/or another element in a circuit.

The body 216 is formed along a tortuous path 240 from the end 218 to the end 220. The path formed by the body 216 is a continuous, non-intersecting path from the end 218 to the end 220. The path is non-intersecting in that the body 216 never crosses over itself. As shown, the body 216 is arranged in the path to form a disc shaped object having a center axis 222. This disc can be flat or have a flat cross-section. For example, the disc formed by the body 216 can be substantially larger (e.g., at least ten times larger) along two different, orthogonal directions in the same two-dimensional plane than along a third orthogonal direction. The ends 218, 220 are located radially outside of most of the body 216 (e.g., closer to an outer edge 224 of the disc), as shown in FIG. 1. Alternatively, one or more of the ends 218, 220 can be closer to the center axis 222 than the outer edge 224.

The path formed by the body 216 form several concentric arcs 226 around the center axis 222. The arcs 226 are formed on opposite sides of a midsection line 228 of the body 216. This midsection line 228 linearly extends from one end 218 to the other end 220 of the body 216. In the illustrated embodiment, the body 216 forms a disc shape that is asymmetric about or on opposite sides of the midsection line 228. Alternatively, the body 216 may form a disc shape that is symmetric about or on opposite sides of the midsection line 228.

The arcs 226 on each side of the midsection line 228 are different sizes. For example, the outermost arc 226 (e.g., the arc 226 that is the largest radial distance from the center axis 222) of the arcs 226 on one side of the midsection line 228 is the largest arc 226 of the arcs 226 on that same side of the midsection line 228, the next outermost arc 226 (e.g., the arc 226 that is the second largest radial distance from the center axis 222) of the arcs 226 on one side of the midsection line 228 is the second largest arc 226 of the arcs 226 on that same side of the midsection line 228, and so on. The arcs 226 are larger or smaller based on the length of the segment of the body 216 that forms each of the arcs 226. In the illustrated embodiment, the path formed by the body 216 includes the arcs 226 coupled by connecting segments 232 of the body 216 that extend between the arcs 226. In the illustrated embodiment, the connecting segments 232 of the body 216 cross over or intersect the midsection line 228. One of the connecting segments 232 (e.g., the connecting segment that couples the shortest length arcs 226) intersects the center axis 222 due to the center axis 222 extending through this connecting segment 232. Optionally, this connecting segment 232 can include an opening, hole, or gap through which the center axis 222 extends.

Different segments of the path formed by the body 216 are spatially spaced apart from each other by a gap 230. For example, the neighboring arcs 226 are spaced apart and separate from each other by different portions of the gap 230. The gap 230 is a single, continuous spatial separation that extends in a spiral path around the center axis 222, similar to the spiral path formed by the body 216. Alternatively, the gap 230 may be formed by two or more gaps that are separated from each other by the body 216.

The gap 230 allows for a cooling fluid, such as air, to pass between the arcs 226 of the body 216 and at least partially pass through the disc shape formed by the body 216. This can help to more rapidly and more effectively cool the body 216. For example, the same mass, flow, or mass flow rate of a cooling fluid directed toward the resistor 208 in directions along and/or parallel to the center axis 222 may be able to more rapidly cool, may cool the resistor 208 by a greater amount, and/or may prevent a larger increase in temperature of the resistor 208 relative to the same mass, flow, or mass flow rate of the same cooling fluid directed toward a resistor formed of the same material but in the shape of a planar plate.

Figure 2:
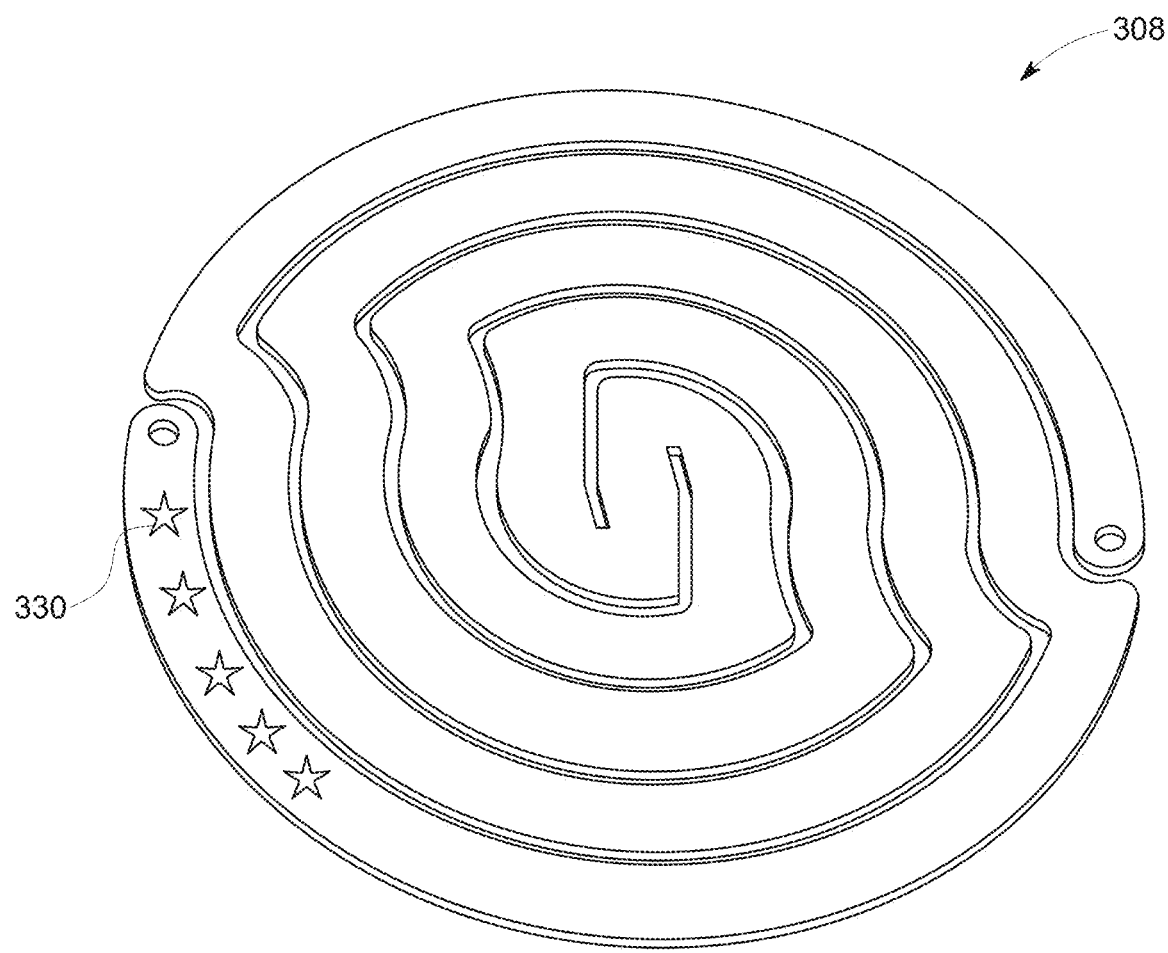
FIG. 2 illustrates another example of an asymmetric disc-shaped resistor with cooling holes.

FIG. 2 illustrates another example of a resistor 308. The resistor 308 can be similar to the resistor 208, with one difference being the presence of cooling holes 330 formed through the body 216 of the resistor 308 in one or more locations. The cooling holes 330 can provide additional spaces for the cooling fluid to pass through the body of the resistor 308, which can increase the cooling of the resistor 308 relative to the resistor 208 that does not include the cooling holes 330. While the cooling holes 330 are shown in only a small part of one arc 226 of the resistor 308, alternatively, the cooling holes 330 may be positioned in more arcs 226 or along more of the length of the body forming the resistor 308. Additionally, the shape of the cooling holes 330 may differ from what is shown in FIG. 2.

Figure 3:
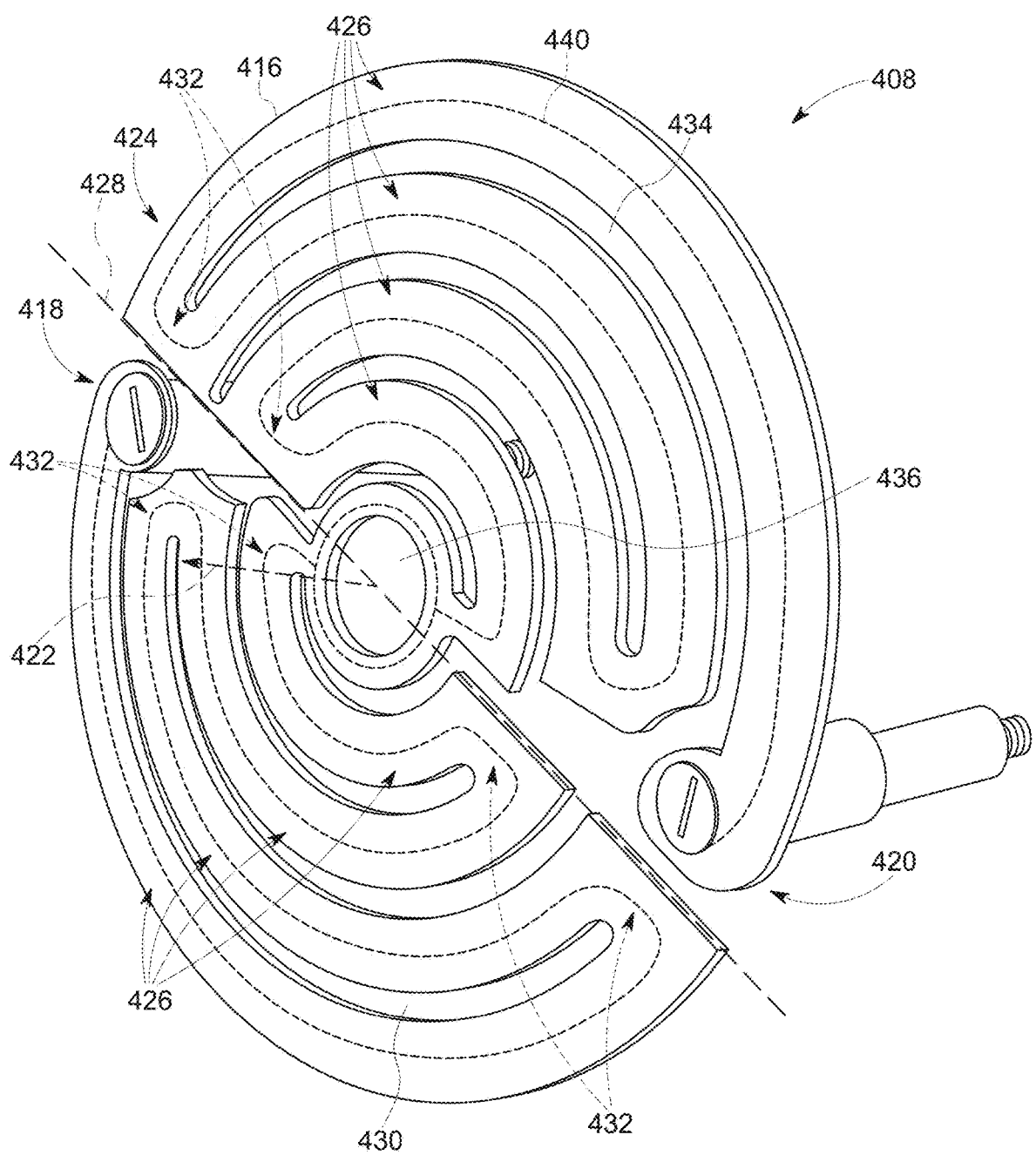
FIG. 3 illustrates another example of an asymmetric disc-shaped resistor with a center cooling hole.

FIG. 3 illustrates another example of a resistor 408. The resistor 408 is formed from an elongated body 416 that extends from a first terminal end 418 to an opposite terminal end 420. The body 416 is a continuous body from the end 418 to the end 420, without gaps, breaks, or the like, in the body 416. Alternatively, the body 416 can be formed from two or more separate segments that are joined together.

The body 416 can be formed from a resistive material that resists the conduction of current from the end 418 to the end 420, but that is at least partially conductive to current from the end 418 to the end 420. The end 418 and/or the end 420 can be conductively coupled with a powered system, another resistor, and/or another element in a circuit. The body 416 is formed along a tortuous, non-intersecting path 440 from the end 418 to the end 420. The body 416 may be continuous from the end 418 to the end 420, or optionally can be formed from two or more separate segments that are joined together. The body 416 is arranged in the path to form a disc-shaped object having a center axis 422. This disc can be flat or have a flat cross-section. The ends 418, 420 are located radially outside of most of the body 416 (e.g., closer to an outer edge 424 of the disc). Alternatively, one or more of the ends 418, 420 can be closer to the center axis 422 than the outer edge 424.

The path formed by the body 416 has several concentric arcs 426 around the center axis 422. The arcs 426 are formed on opposite sides of a midsection line 428 of the body 416. In the illustrated embodiment, the ends 418, 420 are on opposite sides of the midsection line 428, but alternatively one or both of the ends 418, 420 can be on the line 428 or on the same side of the line 428. In the illustrated embodiment, the body 416 forms a disc shape that is asymmetric about or on opposite sides of the midsection line 428. Alternatively, the body 416 has a disc shape that is symmetric about or on opposite sides of the midsection line 428. The arcs 426 on each side of the midsection line 428 are different sizes. For example, the arcs 426 that are closer to the outer edge 424 are larger than the arcs 426 that are closer to the center axis 422.

The body 416 includes several connecting segments 432 that extend between the arcs 426. In the illustrated embodiment, the connecting segments 432 do not cross over or intersect the midsection line 428. For example, the connecting segments 432 include bends between the arcs 426 connected by each connecting segment 432. Due to these bends, the path formed by the body 416 wraps or bends back and forth along opposite circumferential directions of the disc-shaped resistor 408 on each side of the opposite halves of the resistor 408 (that are on opposite sides of the midsection line 428).

Different segments of the path formed by the body 416 are spatially spaced apart from each other by gaps 430, 434, 436. The gaps 430, 434, 436 allow for a cooling fluid, such as air, to pass between the arcs 426 of the body 416 and at least partially pass through the disc shape formed by the body 416. For example, one gap 430 can allow the cooling fluid to pass between the arcs 426 on one side of the midsection line 428, another gap 434 can allow the cooling fluid to pass between the arcs 426 on the opposite side of the midsection line 428, and another gap 436 can allow the cooling fluid to pass between the joined arcs 426 that create a circle or other annulus extending around the center axis 422. These gaps 430, 434, 436 can help to more rapidly and more effectively cool the body 416, as described above.

Figure 4:
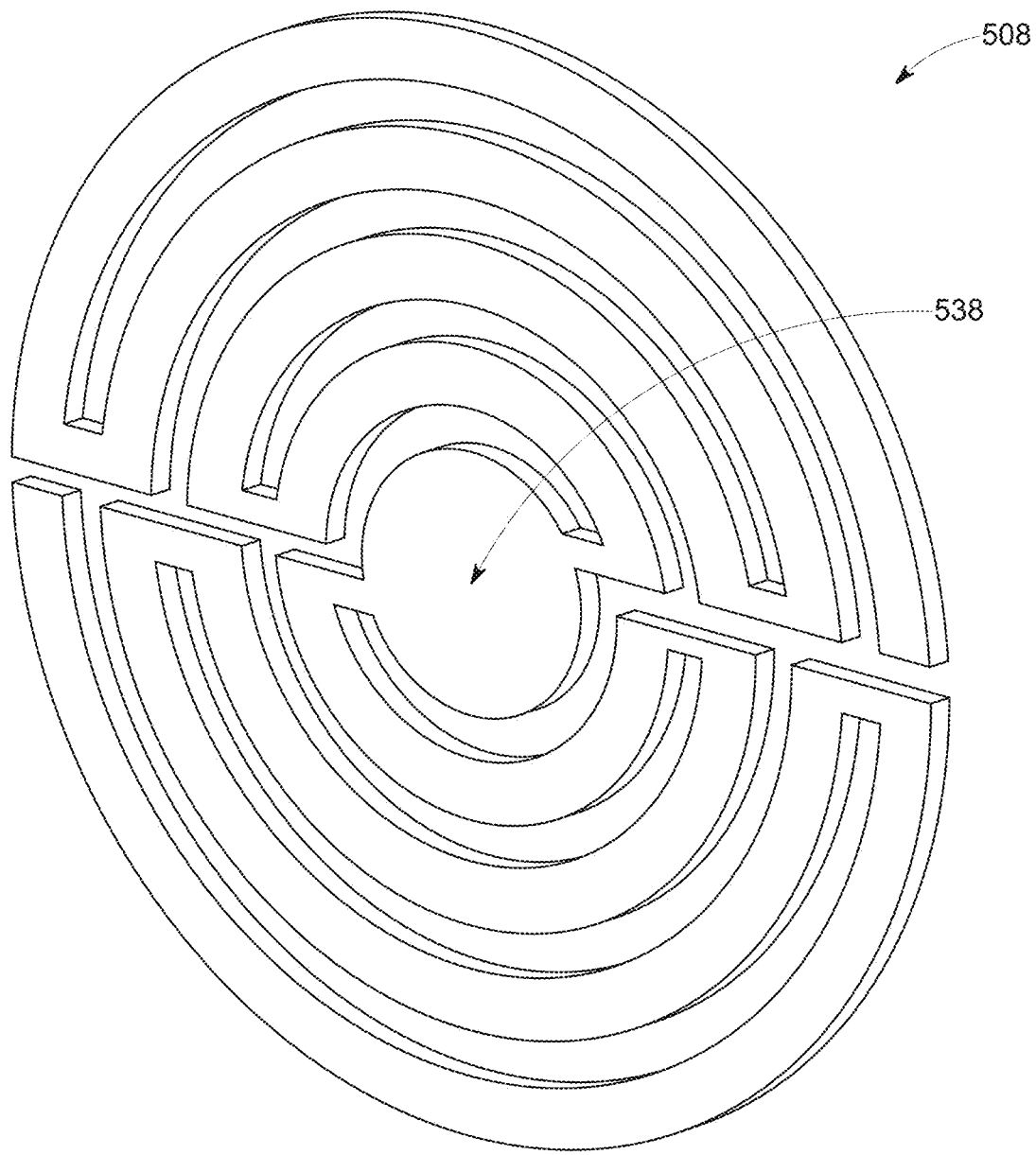
FIG. 4 illustrates another example of an asymmetric disc-shaped resistor with a center plate and formed from a planar body.

FIG. 4 illustrates another example of a resistor 508. The resistor 508 is similar to the resistor 408 shown in FIG. 3 in that the resistor 508 is formed from an elongated body extending between opposite terminal ends along a tortuous, non-intersecting path. The paths formed by the bodies of the resistors 408, 508 may be the same, with one difference being the absence of the gap 434 in the resistor 508. As shown in FIG. 4, the resistor 508 includes a center plate 538 through which the center axis 222 extends instead of the gap 434.

Figure 5:
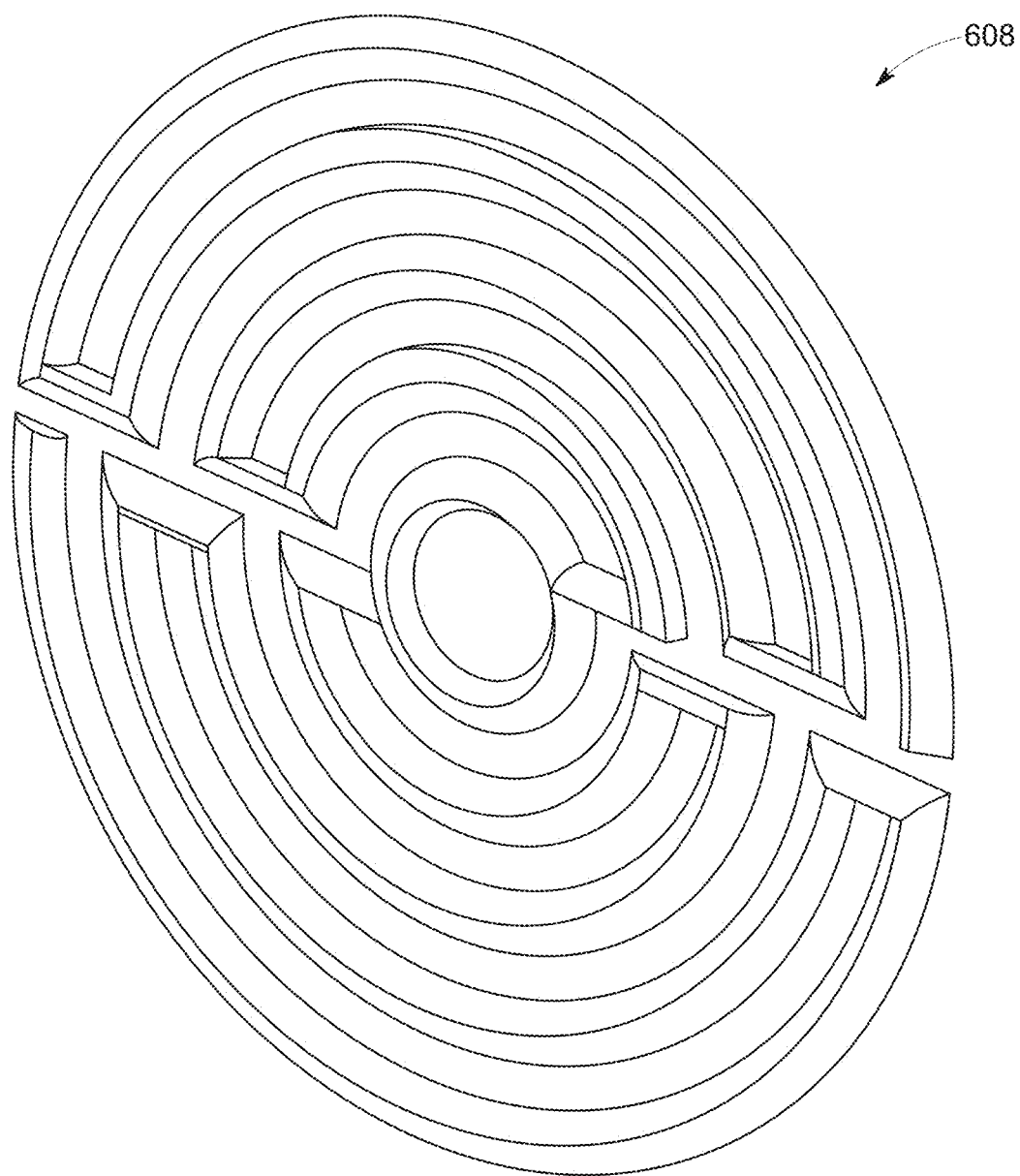
FIG. 5 illustrates another example of an asymmetric disc-shaped resistor with a center plate and formed from a semi-circular body.

FIG. 5 illustrates another example of a resistor 608. The resistor 608 is similar to the resistor 408 shown in FIG. 3 in that the resistor 608 is formed from an elongated body extending between opposite terminal ends along a tortuous, non-intersecting path. The paths formed by the bodies of the resistors 408, 608 may be the same, with one difference being the cross-sectional shapes of the bodies forming the resistors 408, 608. As shown in FIGS. 3 and 5, the cross-sectional shape of the body of the resistor 408 is a planar, square, or rectangular shape, while the cross-sectional shape of the body of the resistor 608 is a semi-circular shape. Alternatively, the cross-sectional shape of the body of the resistor 608 may be a circular or oval shape, as described in more detail below. The semi-circular, circular, or oval cross-sectional shape can be referred to as a curved cross-sectional shape, while the planar, square, or rectangular cross-sectional shape can be referred to as a polygon cross-sectional shape. The curved cross-sectional shape of one or more of the bodies forming the resistors described herein can provide for increased surface area per unit length relative to the polygon cross-sectional shapes described herein. As the surface area of the resistor increases, the rate at which heat is dissipated from the resistor also can increase as more of the resistor is exposed to the cooling fluid.

Figure 6:
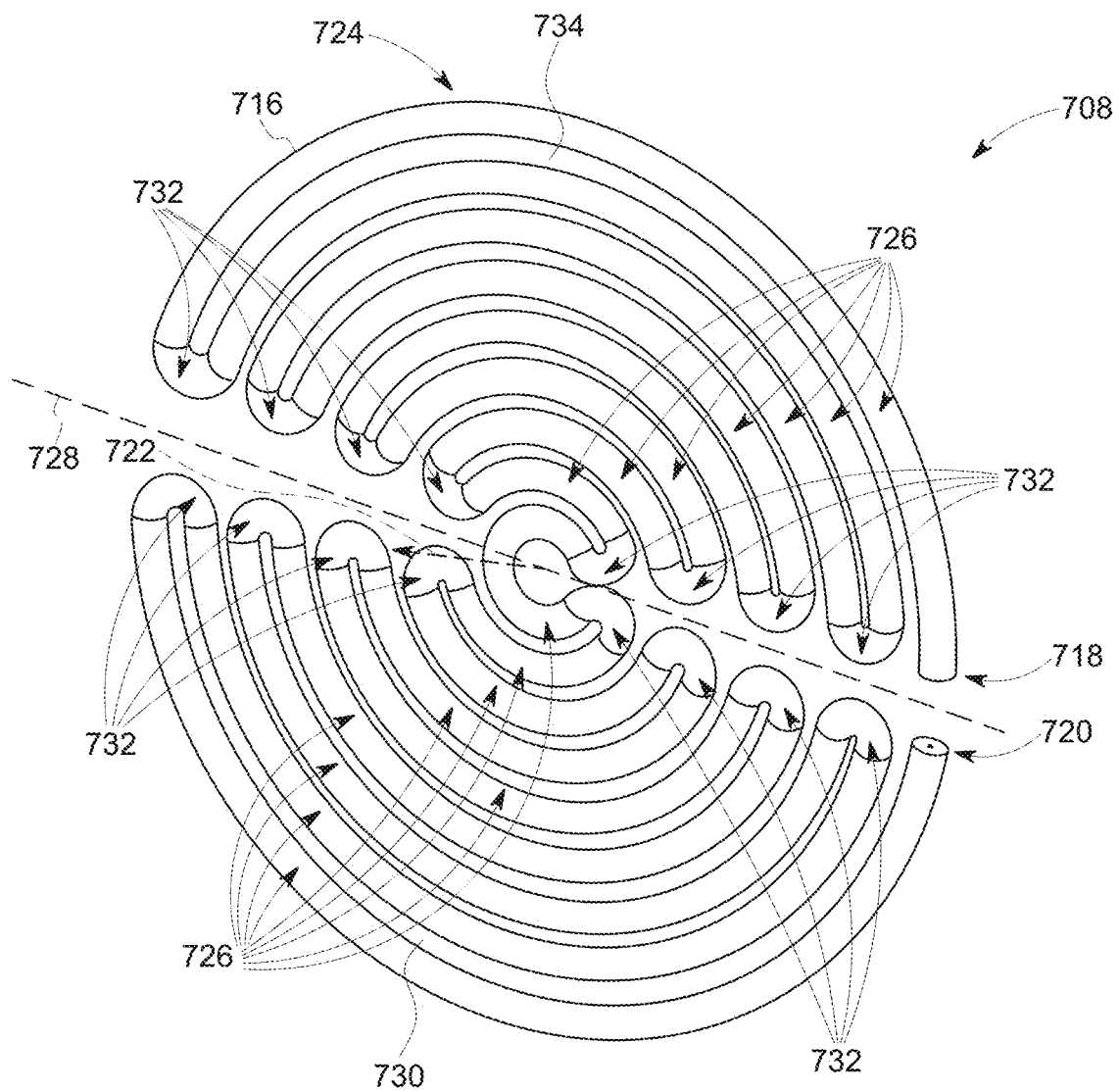
FIG. 6 illustrates another example of a symmetric disc-shaped resistor with a round body.

FIG. 6 illustrates another example of a resistor 708. The resistor 708 is similar to the resistors 208, 308, 408, 508, 608 in that the resistor 708 is formed from an elongated body 716 extending between opposite terminal ends 718, 720, with the body 716 forming a disc-shaped resistor and extending along a tortuous, non-intersecting path from one end 718 to the other end 720.

The body 716 is a continuous body from the end 718 to the end 720 without gaps, breaks, or the like, in the body 716. Alternatively, the body 716 can be formed from two or more separate segments that are joined together. The body 716 can be formed from a resistive material that resists the conduction of current from the end 718 to the end 720, but that is at least partially conductive to current from the end 718 to the end 720. The end 718 and/or the end 720 can be conductively coupled with the powered system, another resistor, and/or another element in a circuit. The body 716 has a circular cross-sectional shape, but alternatively may have another curved cross-sectional shape or may have a polygon cross-sectional shape.

The body 716 is formed along a tortuous, non-intersecting path from the end 718 to the end 720. The body 716 may be continuous from the end 718 to the end 720, or optionally can be formed from two or more separate segments that are joined together. The body 716 is arranged in the path to form a disc-shaped object having a center axis 722. The ends 718, 720 are located radially outside of most of the body 716 (e.g., closer to an outer edge 724 of the disc). Alternatively, one or more of the ends 718, 720 can be closer to the center axis 722 than the outer edge 724.

The path formed by the body 716 has several concentric arcs 726 around the center axis 722. The arcs 726 are formed on opposite sides of a midsection line 728 of the body 716. In the illustrated embodiment, the ends 718, 720 are on opposite sides of the midsection line 728 and face each other across the midsection line 728. Alternatively, one or both of the ends 718, 720 can be on the line 728 or can contact each other (e.g., such that the body 716 does not include the ends 718, 720 but forms a completely continuous looping body). The arcs 726 on each side of the midsection line 728 are different sizes. For example, the arcs 726 that are closer to the outer edge 724 are larger than the arcs 726 that are closer to the center axis 722.

The body 716 includes several connecting segments 732 that connect the arcs 726. In the illustrated embodiment, the connecting segments 732 do not cross over or intersect the midsection line 728. The connecting segments 732 are curved bends between the arcs 726 that are connected by each connecting segment 732. Due to these bends, the path formed by the body 716 wraps or bends back and forth along opposite circumferential directions of the disc-shaped resistor 708 on each side of the opposite halves of the resistor 708 (that are on opposite sides of the midsection line 728). In contrast to other resistors, the body 716 forms a disc shape that is symmetric about or on opposite sides of the midsection line 428. Alternatively, the body 716 may form a disc shape that is asymmetric about or on opposite sides of the midsection line 728.

Different segments of the path formed by the body 716 are spatially spaced apart from each other by gaps 730, 734. The gaps 730, 734 allow for a cooling fluid, such as air, to pass between the arcs 726 of the body 716 and at least partially pass through the disc shape formed by the body 716. These gaps 730, 734 can help to more rapidly and more effectively cool the body 716, as described above.

Figure 7:
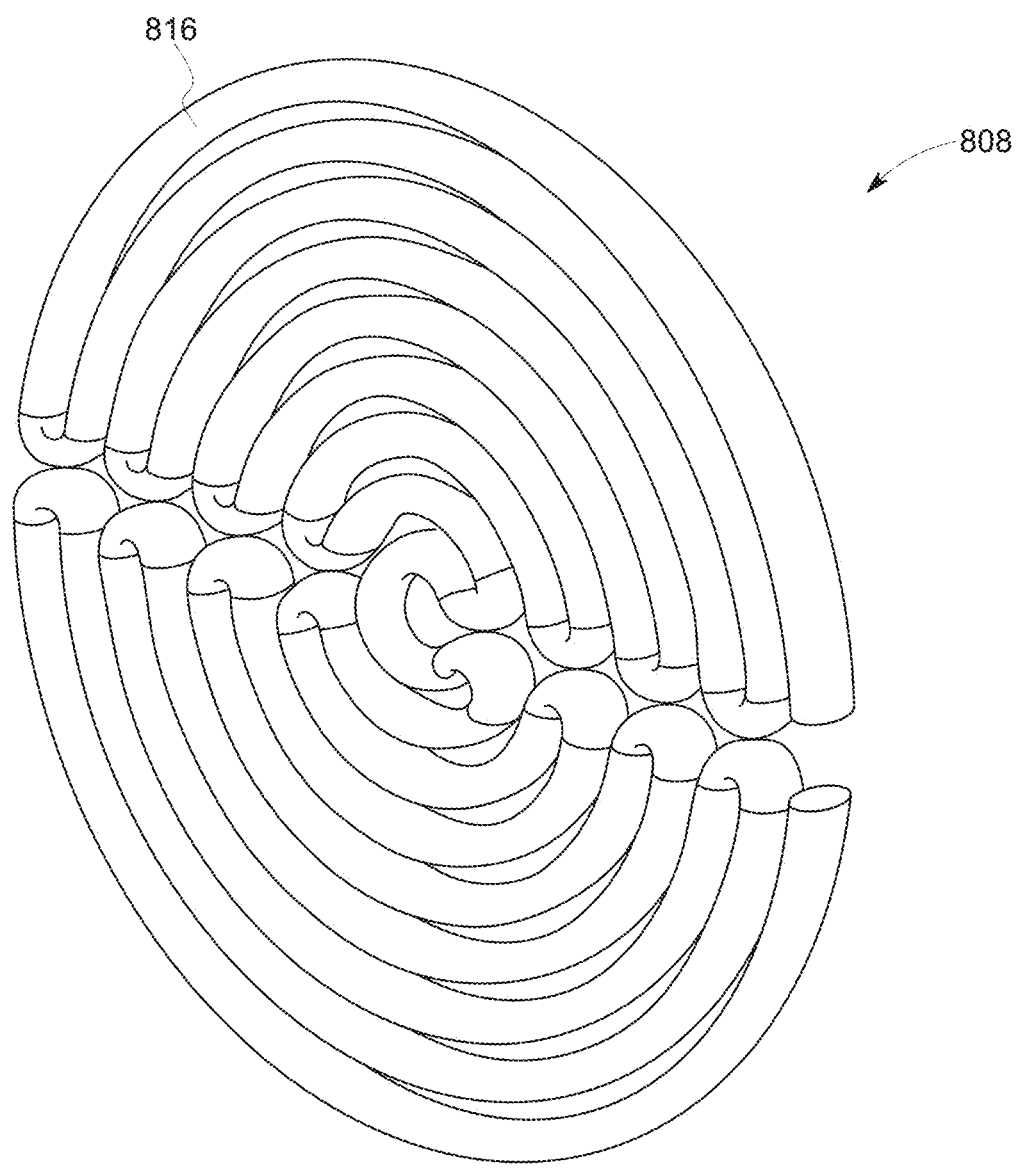
FIG. 7 illustrates another example of a symmetric disc-shaped resistor with an oval body.

FIG. 7 illustrates another example of a resistor 808. The resistor 808 is similar to the resistor 708 except for the cross-sectional shape of bodies 716, 816 forming the resistors 708, 808. In FIG. 6, the body 716 of the resistor 708 is shown as having a circular cross-sectional shape. The body 816 of the resistor 808 shown in FIG. 7 has an oval or elliptical cross-sectional shape. The cross-sectional shape of the body 816 of the resistor 808 can increase the cross-sectional area per unit length of the resistor 808 relative to the resistor 708. As described herein, increasing the cross-sectional area of the resistor 808 can increase the cooling of the resistor 808 and increase the rate at which heat is dissipated from the resistor 808 relative to the resistor 708.

Figure 8:
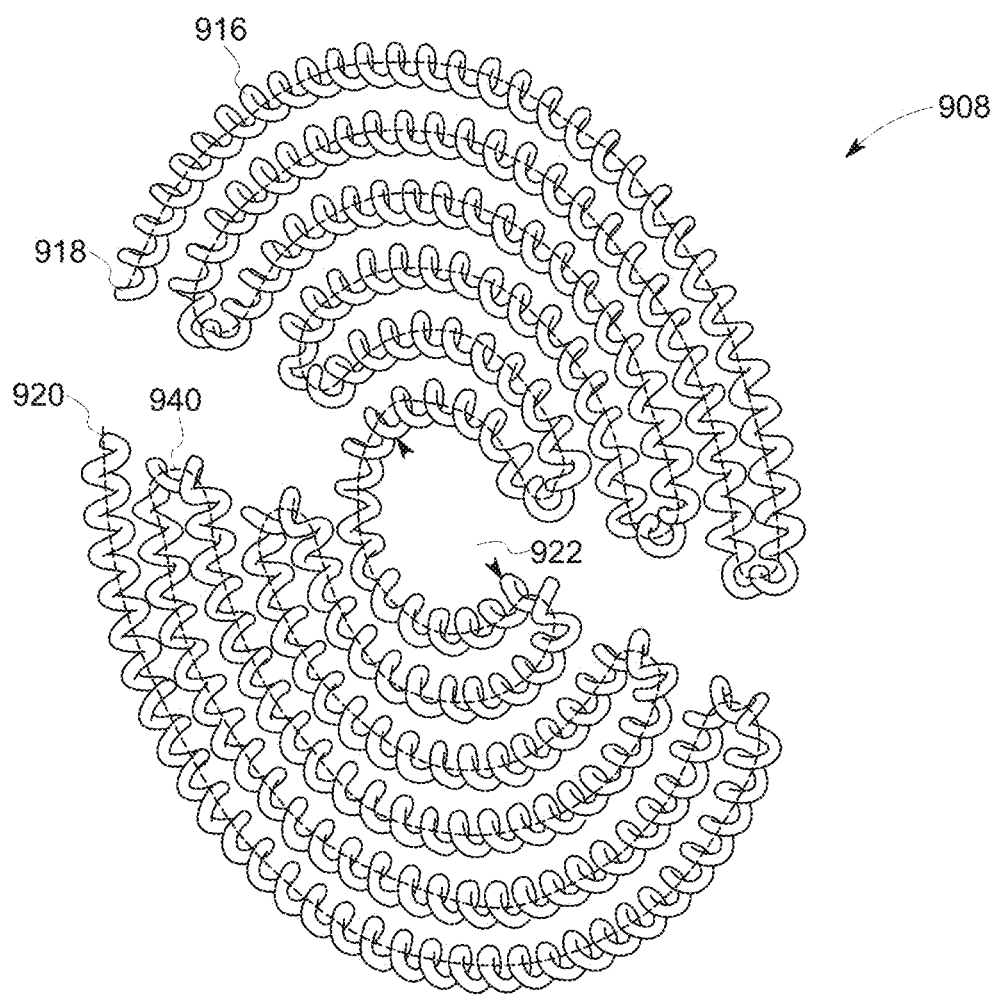
FIG. 8 illustrates another example of a symmetric disc-shaped resistor with a helically wrapped body.

FIG. 8 illustrates another example of a resistor 908. The resistor 908 is shaped similar to the resistors 708, 808 except for the path of a body 916 of the resistor 908. The body 916 of the resistor 908 has a smaller cross-sectional area than the bodies 716, 816 of the resistors 708, 808. But, the body 916 of the resistor 908 helically wraps around the spiral path of the disc shape of the resistor 908. Stated differently, the resistor 908 spirals along a path 940 that at least partially encircles the center axis 922 of the resistor 908. The body 916 of the resistor 908 helically wraps around this path 940 from one terminal end 918 of the body 916 to an opposite terminal end 920 of the body 916. The body 916 of the resistor 908 may have a significantly greater total length from one terminal end 918 to the other terminal end 920 than the bodies that do not helically wrap around the path of the corresponding resistor. This increased length of the body 916 can increase the surface area per unit length of the resistor 908 relative to other resistors that do not have a helically wound body.

The resistors shown in FIGS. 1 through 8 are disc-shaped resistors that may be oriented to face the directions in which the blowers direct air. For example, the center axes of the resistors shown in FIGS. 1 through 8 may be oriented toward the blowers so that the cooling fluid directed by the blowers is directed toward one side of the resistors. This can increase how much of the surface areas of the resistors contacts the cooling fluid in contrast to another orientation of the resistors. Alternatively, the resistors may be oriented in another direction.

Figure 9:
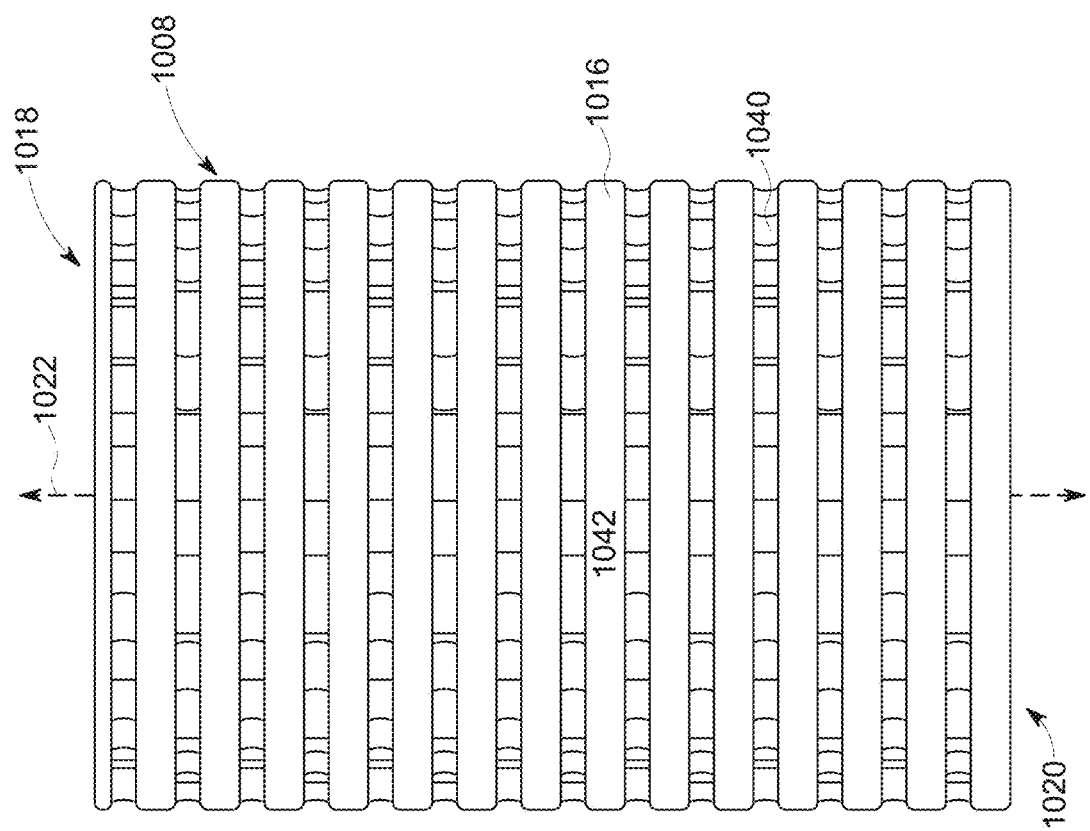
FIG. 9 illustrates another example of cylindrical resistors.
Figure 9:
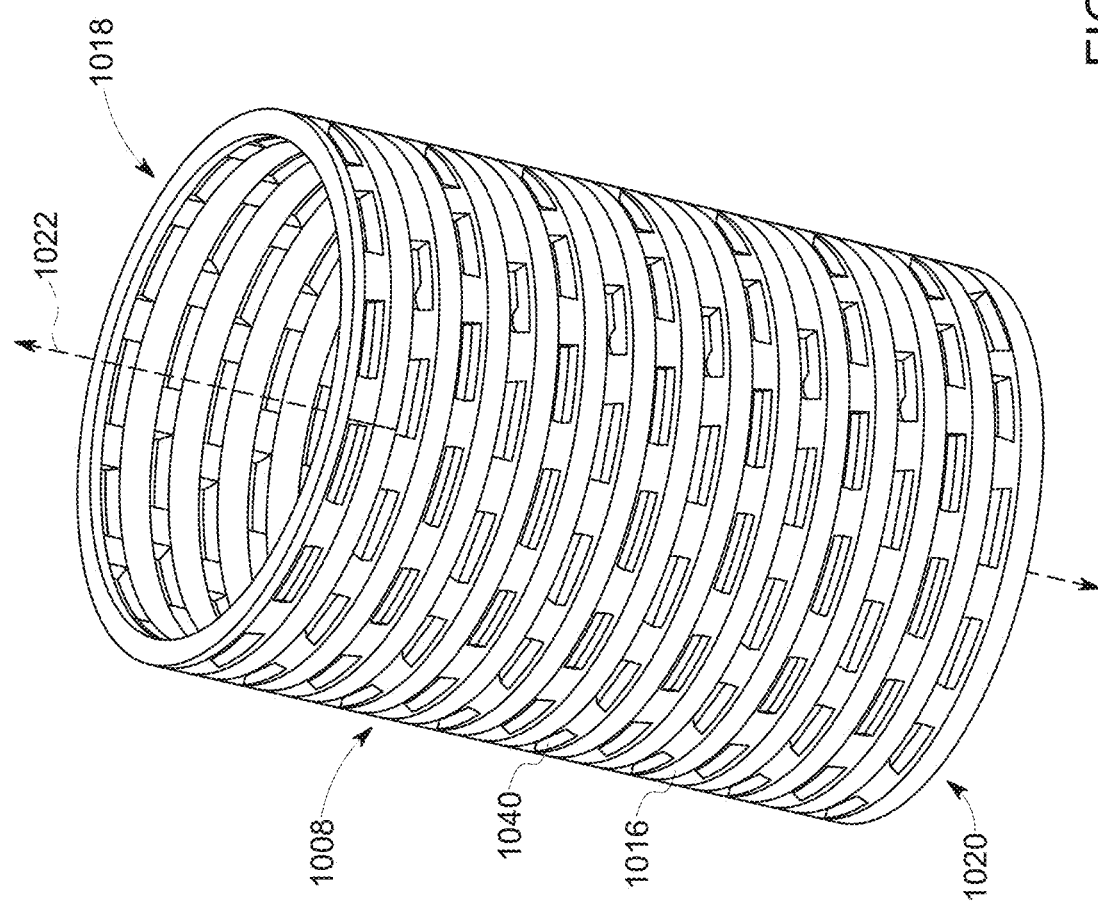
Figure 10:
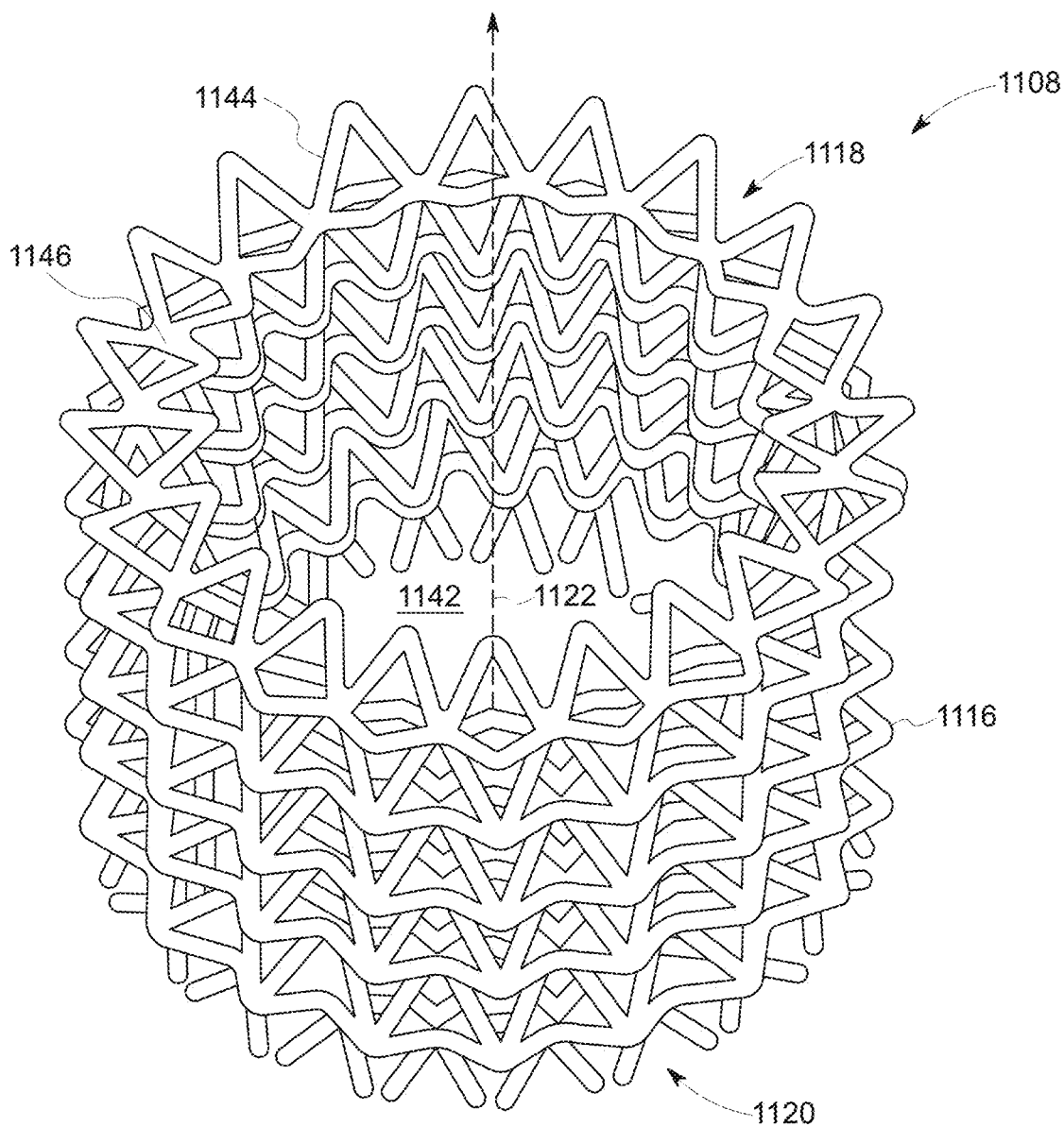
FIG. 10 illustrates one example of a fractal lattice resistor.
Figure 11:
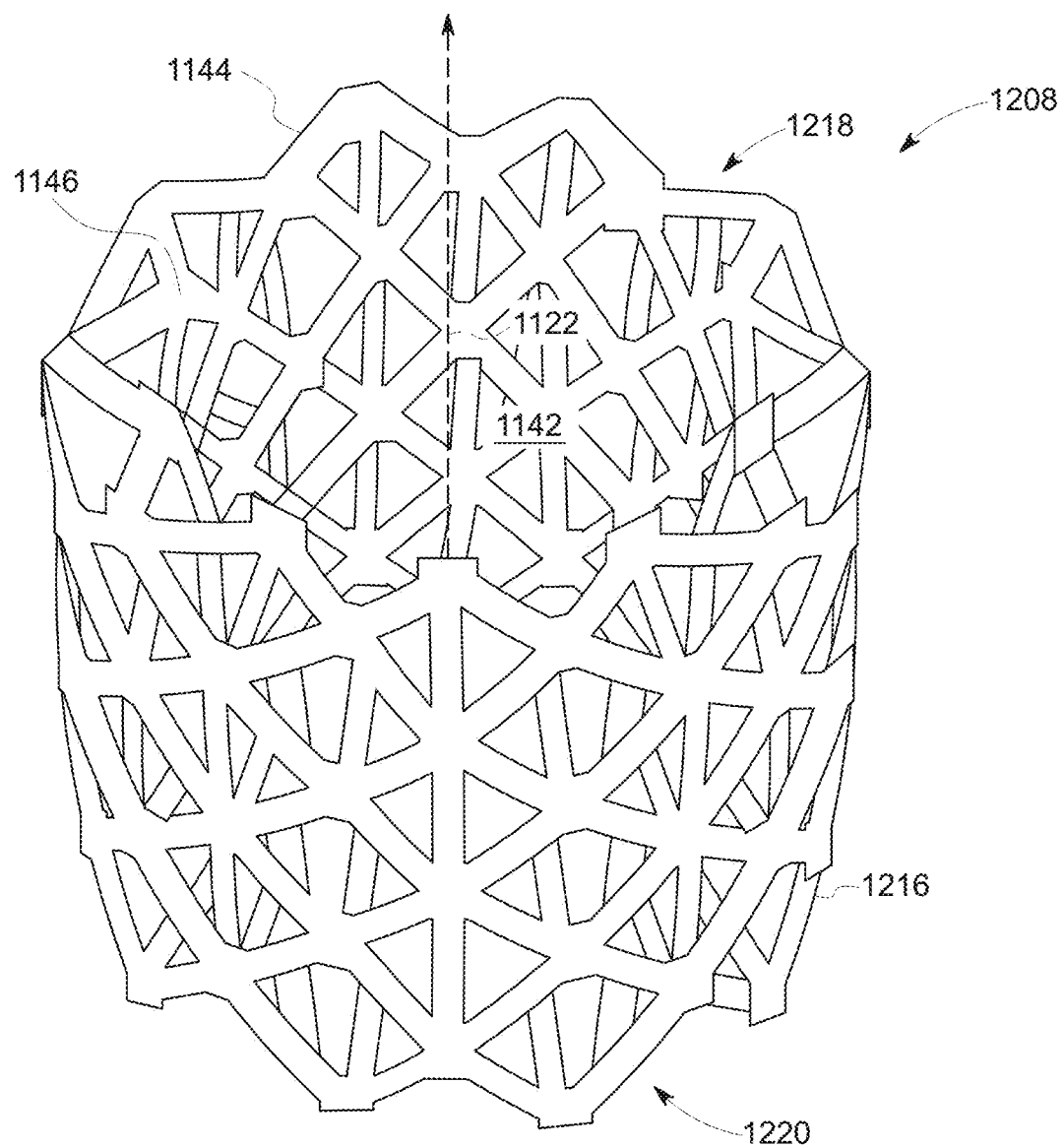
FIG. 11 illustrates another example of a fractal lattice resistor.
Figure 12:
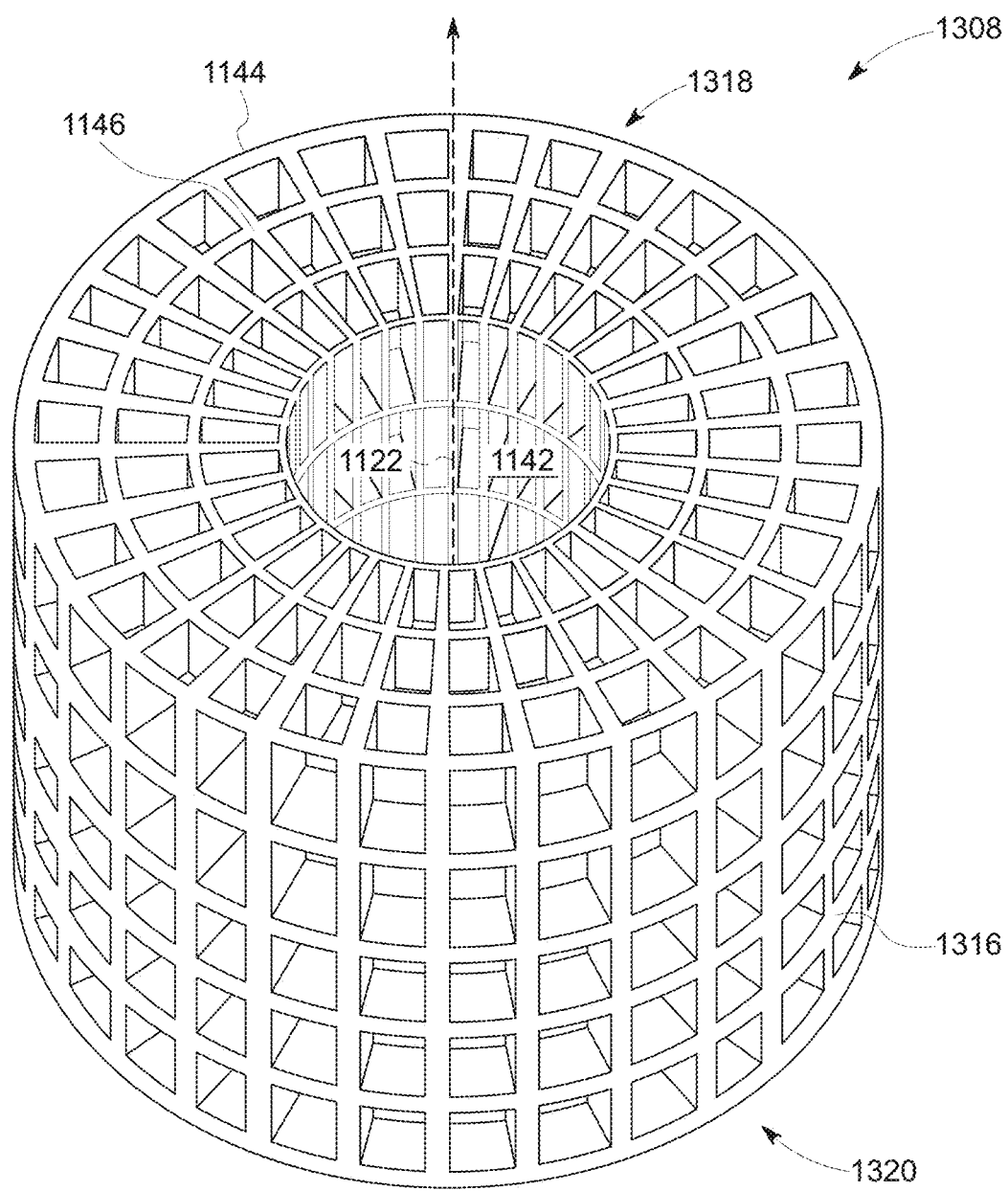
FIG. 12 illustrates another example of a fractal lattice resistor.
Figure 13:
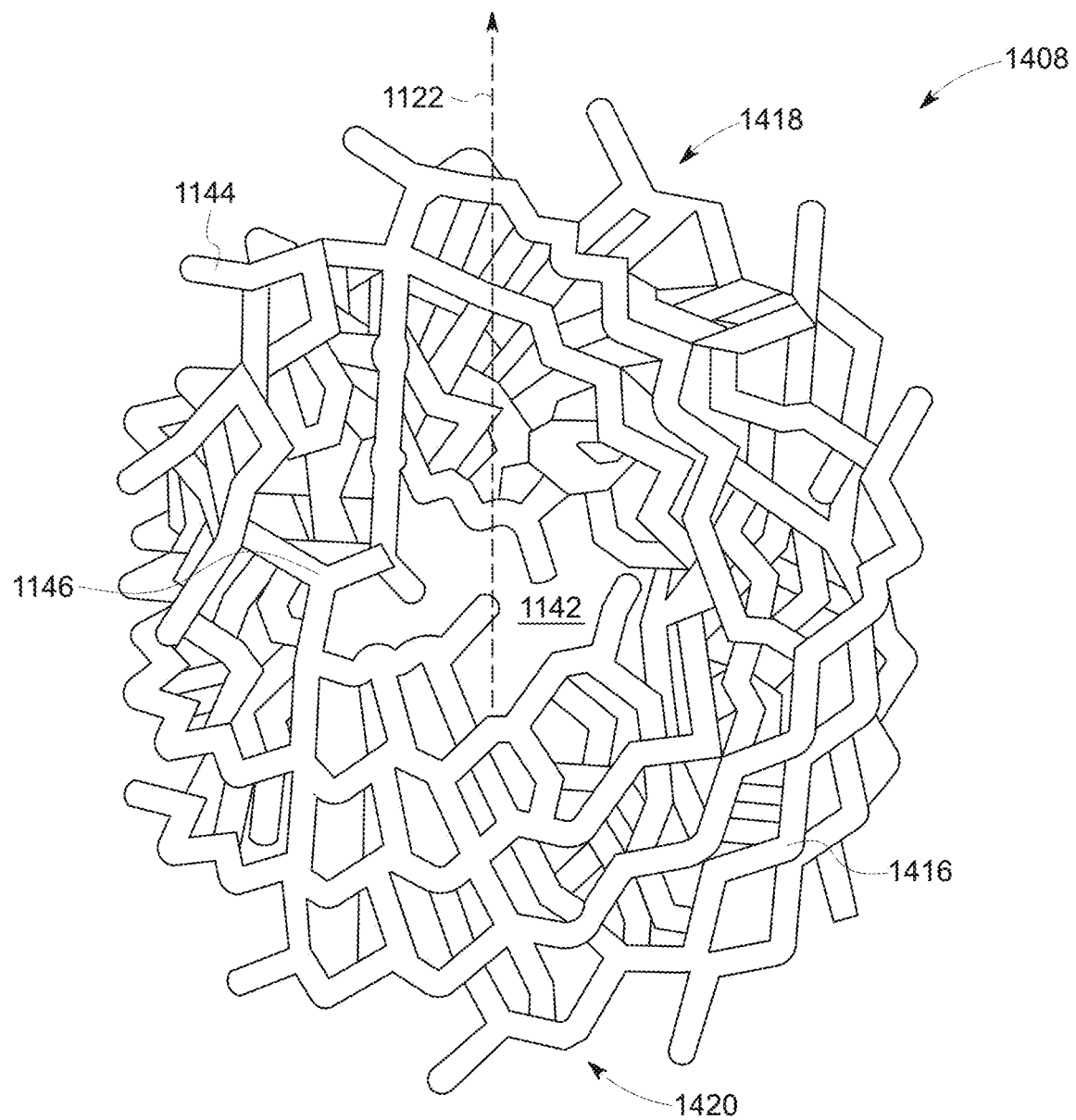
FIG. 13 illustrates another example of a fractal lattice resistor.

FIG. 9 illustrates another example of resistors 1008. Two resistors 1008 are shown in FIG. 9, with one resistor being partially cut-away so that the interior of the resistor 1008 is visible. The resistor 1008 is formed from an elongated body 1016 that extends from a first terminal end 1018 to an opposite terminal end 1020.

In contrast to the bodies of the resistors shown in FIGS. 1 through 8, the body 1016 forms a cylinder-shaped resistor 1008 that is elongated along and extends around a center axis 1022. The body 1016 includes several spatial gaps or cooling holes 1040 through the body 1016 in different locations along the length of the body 1016 from the end 1018 to the opposite end 1020. In the illustrated embodiment, the cooling holes 1040 are slots that are elongated in circumferential directions that extend around the center axis 1022. Optionally, one or more of the cooling holes 1040 may be elongated in axial directions that are parallel to the center axis 1022 or in another direction. In another embodiment, one or more of the cooling holes 1040 is not elongated.

The body 1016 extends around and defines an interior channel, passage, or conduit 1042. The resistor 1008 can be oriented so that the cooling fluid is directed into the interior channel 1042 along the center axis 1022. For example, the body 1016 can be positioned so that the center axis 1022 is oriented along or parallel to a direction oriented toward one of the blowers. Alternatively, the body 1016 can be positioned to that the center axis 1022 is oriented in a direction that is orthogonal to (e.g., that points toward) the blower that directs the cooling fluid toward the body 1016.

The interior channel 1042 and/or cooling holes 1040 allow for the passage of cooling fluid through the body 1016 and to contact increased amounts of the surface area of the body 1016. For example, in contrast to a planar solid plate resistor, the cylinder-shaped resistor 1008 can have the interior surfaces of the channel 1042, the portions of the body 1016 that extend around the cooling holes 1040, and/or the exterior surface of the body 1016 contact the cooling fluid. This can increase the amount of surface area per unit length of the resistor 1008 that contacts and is cooled by the fluid relative to a flat plate resistor.

FIGS. 10 through 13 illustrate additional examples of resistors 1108, 1208, 1308, 1408. The resistors 1108, 1208, 1308, 1408 are formed from elongated bodies 1116, 1216, 1316, 1416 that extend from first terminal ends 1118, 1218, 1318, 1418 to corresponding opposite terminal ends 1120, 1220, 1320, 1420.

The bodies 1116, 1216, 1316, 1416 provide cylinder-shaper resistors 1108, 1208, 1308, 1408 that are elongated along and extends around center axes 1122. The bodies 1116, 1216, 1316, 1416 are formed from several elongated bars or members 1144 that are joined together at nodes 1146 in lattice structures. The lattice structures include the elongated members 1144 joined at the nodes 1146 but otherwise separated and spaced apart from each other. Additionally, the arrangement of the elongated members 1144 and nodes 1146 in the lattice structures of the resistors 1108, 1208, 1308, 1408 differ from each other. The separation between the elongated members 1144 provides volume through which the cooling fluid can flow through the resistors 1108, 1208, 1308, 1408 to contact increased amounts of surface area per unit volume of the resistors 1108, 1208, 1308, 1408 relative to other resistors (e.g., currently used planar plate resistors).

The lattice structures are three-dimensional structures with the members 1144 being elongated in different directions in a three-dimensional space. The lattice structures shown in FIGS. 10 through 13 are different types fractal structures. The members 1144 and nodes 1146 are arranged in a regular repeating pattern along the length of each of the resistors 1108, 1208, 1308, 1408. The lattice structures extend around or encircle a center axis 1122 of the resistors 1108, 1208, 1308, 1408 such that an interior channel 1142 of each of the resistors 1108, 1208, 1308, 1408 is defined by each of the lattice structures.

The resistors 1108, 1208, 1308, 1408 can be oriented so that the cooling fluid is directed into the interior channels 1142 along the center axes 1122. For example, the bodies 1116, 1216, 1316, 1416 can be positioned so that the center axes 1122 are oriented along or parallel to a direction oriented toward one of the blowers. Alternatively, the bodies 1116, 1216, 1316, 1416 can be positioned to that the center axes 1122 are oriented in a direction that is orthogonal to (e.g., that points toward) the blower that directs the cooling fluid toward the bodies 1116, 1216, 1316, 1416.

Figure 14:
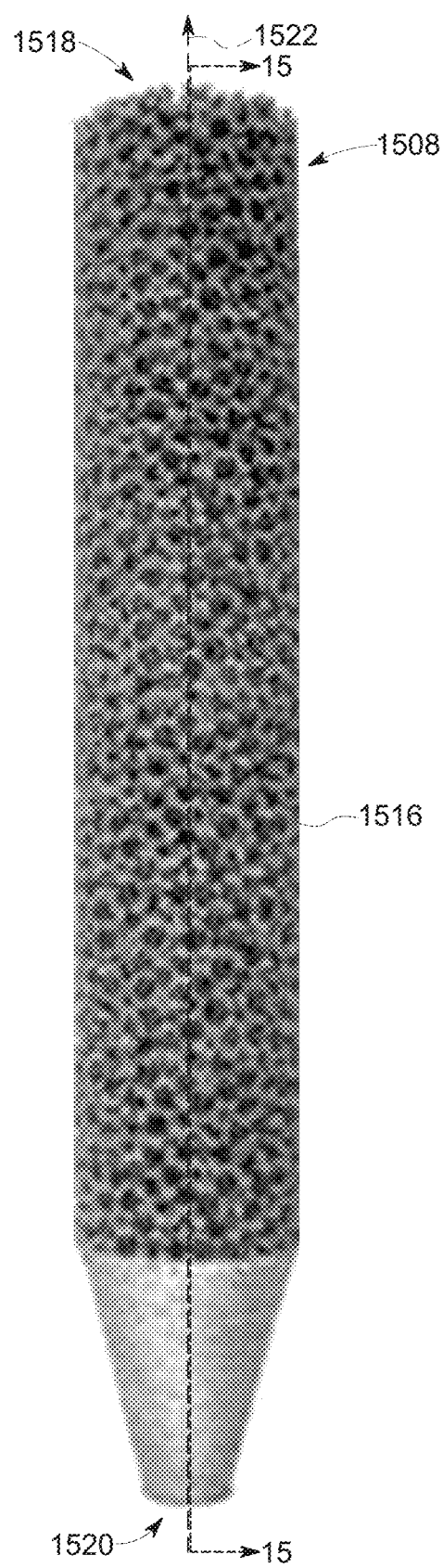
FIG. 14 illustrates one example of an elongated cylindrical resistor having different pore densities.
Figure 15:
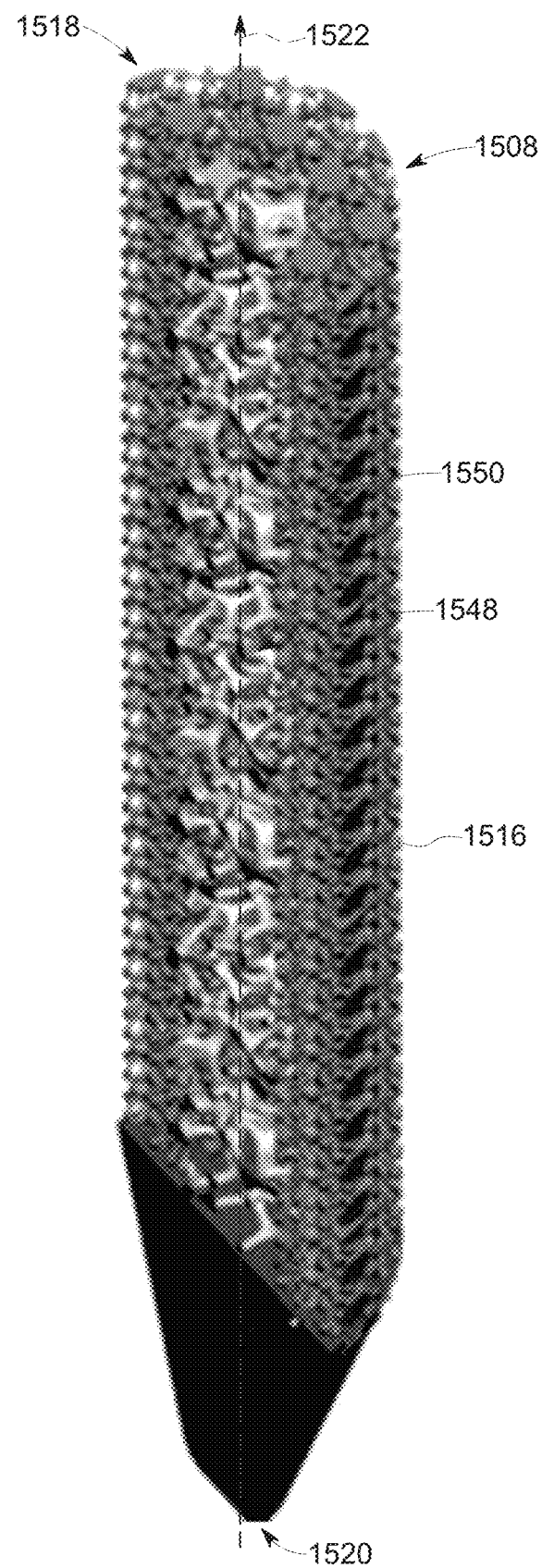
FIG. 15 illustrates a cross-sectional view of the resistor shown in FIG. 15.

FIG. 14 illustrates another example of a resistor 1508. FIG. 15 illustrates a cross-sectional view of the resistor 1508 along line 15-15 in FIG. 14. The resistor 1508 is formed from a porous, elongated body 1516 that extends from a first terminal end 1518 to an opposite terminal end 1520.

The body 1516 is shaped to provide a cylinder-shaped resistor 1508 that is elongated along a center axis 1522. In contrast to one or more other resistors shown herein, the body 1516 is not open or does not form an open channel through which the center axis 1522 extends. The body 1516 is a porous body formed from interconnected open pores in the body 1516. The pores can be interconnected such that the cooling fluid can pass through the body 1516 via the pores. The body 1516 can be a multi-part body formed from an elongated inner or center portion 1548 and at least an elongated outer or outward portion 1550. The inner or center portion 1548 is closer to the center axis 1522 than the outer portion 1550 with the outer portion 1550 being radially outward of the center portion 1548 from the center axis 1522. While only a single outer portion 1550 is shown in FIG. 14, alternatively, the body 1516 can include multiple outer portions 1550 located at different radial distances from the center axis 1522.

The different portions 1550, 1548 of the body 1516 can have different pore densities. For example, the outer portion 1550 can have smaller and/or fewer pores than the inner portion 1548. The reduced pore density (or the increased body density) in the outer portion 1550 can cause more surface area of the body 1516 to come into contact with the cooling fluid than the inner portion 1548. This can allow the outer portion 1550 of the body 1516 to cool more rapidly while permitting the cooling fluid to continue passing into and through the inner portion 1548 of the body 1516.

In one embodiment, the body 1516 is a lattice structure having the volumes between the elongated members and the nodes create the pores. The lattice structure of the outer portion 1550 can have the elongated members and nodes closer together than the inner portion 1548 to provide for a reduced pore density in the outer portion 1550.

The body 1516 can be oriented so that the center axis 1522 is oriented along or parallel to a direction oriented toward one of the blowers. Alternatively, the bodies 1116, 1216, 1316, 1416 can be positioned to that the center axes 1122 are oriented in a direction that is orthogonal to (e.g., that points toward) the blower that directs the cooling fluid toward the bodies 1116, 1216, 1316, 1416. The cooling fluid can pass through or into the pores of the body 1516 to cool the body 1516 from inside the body 1516.

Figure 16:
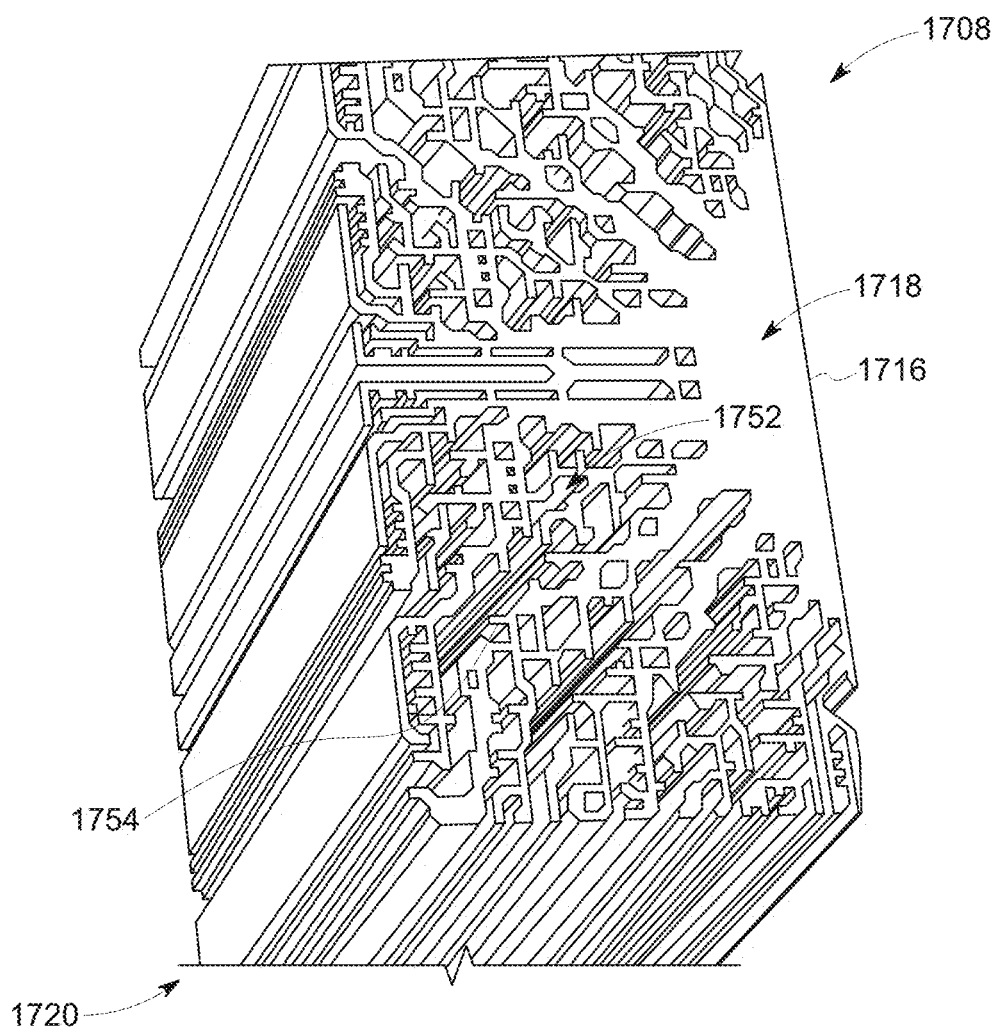
FIG. 16 illustrates a cross-sectional view of a cubic resistor.

FIG. 16 illustrates another example of a resistor 1708. The resistor 1708 is formed from a porous, elongated body 1716 that extends from a first terminal end 1718 to an opposite terminal end 1720.

The body 1716 is a cubic-shaped object having elongated channels 1752 that extend through the length of the body 1716. These channels 1752 can be open at the end 1718 and the end 1720 and can provide a passage for cooling fluid to flow through the body 1716. The portions of the body 1716 between the channels 1752 can have a fractal shape with fins or elongations 1754 extending into the channels 1752. The length of the channels 1752 and/or the presence of the elongations 1754 into the channels 1752 can increase the surface area of the body 1716 that is exposed to the cooling fluid (relative to shorter channels, no channels, or having no elongations). The body 1716 can be oriented so that the channels 1752 are elongated along directions that point toward one of the blowers. The cooling fluid can pass through the channels 1752 to cool the body 1716 from inside the body 1716.

Figure 17:
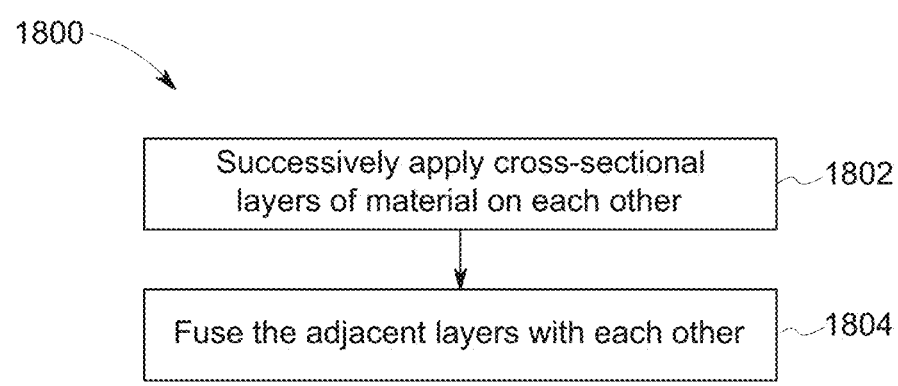
FIG. 17 illustrates a flowchart of one embodiment of a method for additively manufacturing a resistor of a powered system.

FIG. 17 illustrates a flowchart of one embodiment of a method 1800 for additively manufacturing a resistor of a powered system. The method 1800 can be used to create one or more of the resistors described herein. At 1802, multiple layers of material are applied onto each other. Each of these layers forms a cross-section of the resistor being formed. At 1804, adjacent layers are fused together. These layers can be fused as the layers are applied. For example, subsequent to or while a new layer is applied onto a previously applied layer, the new and previously applied layers can be fused together. The layers can be fused together using one or more sources of energy, such as laser light. The fused layers form the body of the three-dimensional resistor, which can have cooling channels, holes, or the like, and which can have a three-dimensional shape, as described herein.

Figure 18:
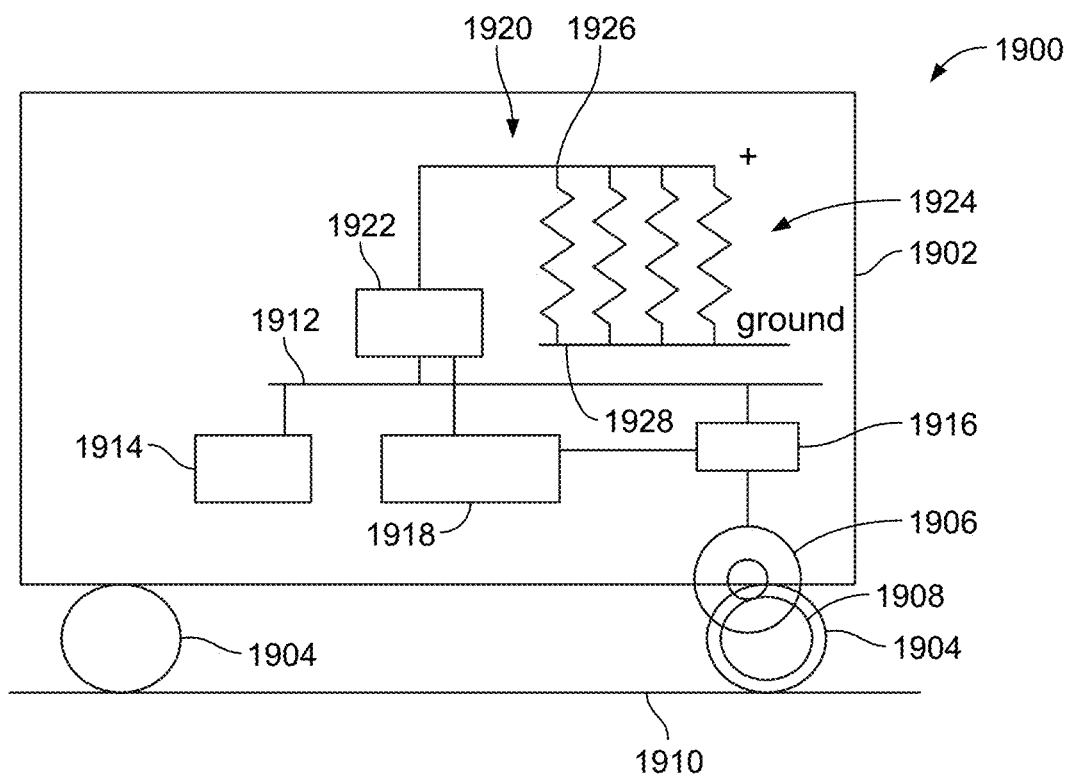
FIG. 18 is a schematic view of a vehicle with a braking system.

In another embodiment, with reference to FIG. 18, a vehicle 1900 (e.g., locomotive) or other powered system (e.g., generator) includes a chassis or other support frame or platform 1902, wheels 1904 (or wheel/axle pairs), and one or more traction motors 1906, at least one of which is connected to one of the wheels by a gear set 1908 (for example). Operation of the motor causes the wheel to rotate for moving the vehicle along a route 1910. The vehicle further includes an electrical power traction system having a DC bus 1912, a source of electrical power 1914 (e.g., a fuel engine that drives an alternator, and/or an energy storage device), at least one inverter 1916 (e.g., there may be one or more inverters per traction motor), a controller 1918, and a dynamic braking dissipation system 1920. The inverter is configured to convert DC electrical power that is present on the DC bus to an electrical waveform that is suitable for powering the motor, e.g., the inverter may be configured to convert DC to 3-phase AC for electrically powering an AC traction motor. For doing so, the inverter may be controlled by the controller 1918, that is, the controller may be configured to generate switching control signals for switching solid-state power elements (e.g., transistors) of the inverter on and off, to convert the DC to another power waveform. The electrical power traction system may be configured for a dynamic or regenerative braking mode of operation, wherein the inverter and/or motor are controlled for the motor to act as a generator. In such a mode of operation, the motor provides resistance to the wheel/axle, thereby slowing the vehicle. In turn, the motor generates electricity. The generated electricity may be routed back to the DC bus, or it is otherwise passed to the dynamic braking dissipation system 1920. (In the case of regenerative braking, some portion of the generated electrical power is instead used to charge one or more energy storage device.) The dynamic braking dissipation system may include a chopper or other controlled inverter or switch 1922 (which is controlled by the controller), and also includes an array or grid of resistor elements 1924. The resistor elements are electrically connected (in series and/or in parallel) between an output of the chopper 1922 and electrical ground. The resistor elements are configured to dissipate electrical power as heat, which is expelled from the vehicle using a blower or other cooling element or system. Thus, when the system generates electrical power during dynamic braking, the dynamic braking dissipation system dissipates the electrical power as waste heat, to the extent the system does not otherwise utilize the dynamic braking power for running onboard loads, charging energy storage devices, or otherwise.

In an embodiment, in the vehicle 1900 or other powered system, one or more of the resistor elements 1924 each respectively comprises an elongated body that extends from a first terminal end 1926 to an opposite second terminal end 1928, the body forming a continuous, non-intersecting path (e.g., a serpentine path) that extends from the first terminal end to the second terminal end and that forms a disc. The body is configured to receive electric current from the vehicle at the first terminal end and conduct and provide electric resistance to the electric current received from the vehicle to dissipate at least part of the electric current as heat from the body. The second terminal end of the body is configured to be coupled with at least one other resistor of the vehicle in one or more of a parallel or series arrangement in an electric circuit. The body may be an additively manufactured body. (The resistor element/elements may be further configured as described elsewhere herein and as shown in the drawings.)

In an embodiment, in the vehicle 1900 or other powered system, one or more of the resistor elements 1924 each respectively comprises an elongated cylindrical body having nodes and elongated members. The elongated members interconnect the nodes to form a lattice structure having openings between the nodes and the elongated members. The system may be configured for the flow of a cooling fluid (e.g., air or liquid) through the openings. The body is configured to receive electric current from the vehicle and to conduct and provide electric resistance to the electric current received from the vehicle to dissipate at least part of the electric current as heat from the body. The body also is configured to be coupled with at least one other resistor of the vehicle in one or more of a parallel or series arrangement in an electric circuit. The body may be an additively manufactured body. (Also, alternatively or additionally, the resistor element/elements may be further configured as described elsewhere herein and as shown in the drawings.)

Figure 19:
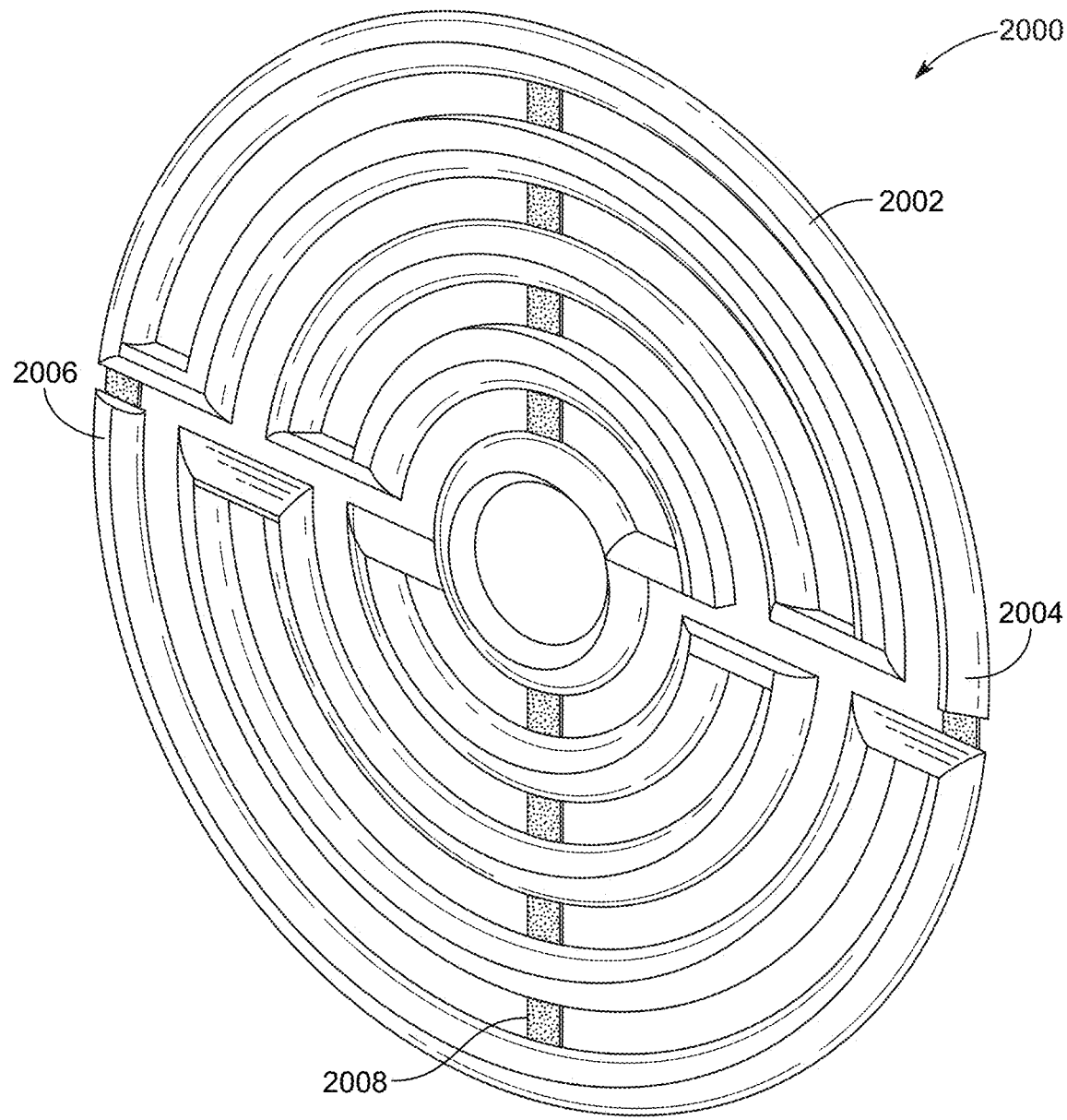
FIG. 19 and FIG. 20 illustrate other embodiments of resistors.

In an embodiment, with reference to FIG. 19, a resistor 2000 includes an elongated body 2002 that extends from a first terminal end 2004 to an opposite second terminal end 2006. The body forms a continuous, non-intersecting path that extends from the first terminal end to the second terminal end and that forms a disc. The body is configured to receive electric current from a powered system at the first terminal end and conduct and provide electric resistance to the electric current received from the powered system to dissipate at least part of the electric current as heat from the body. The resistor may include insulative (non-electrically conducting) support members 2008 that intersect with and are attached to the conductive body. The support members do not conduct electricity, such that the conductive body, winding in a tortuous or serpentine manner, extends from one terminal to the other without the arms or winding portions of the body intersecting with other arms or winding portions of the body. In one aspect, the support members and the body are made using an additive manufacturing process (e.g., different materials for the support members and body), and are thereby unitary. The support members may be thermally conductive, thereby to help remove heat from the body.

Figure 20:
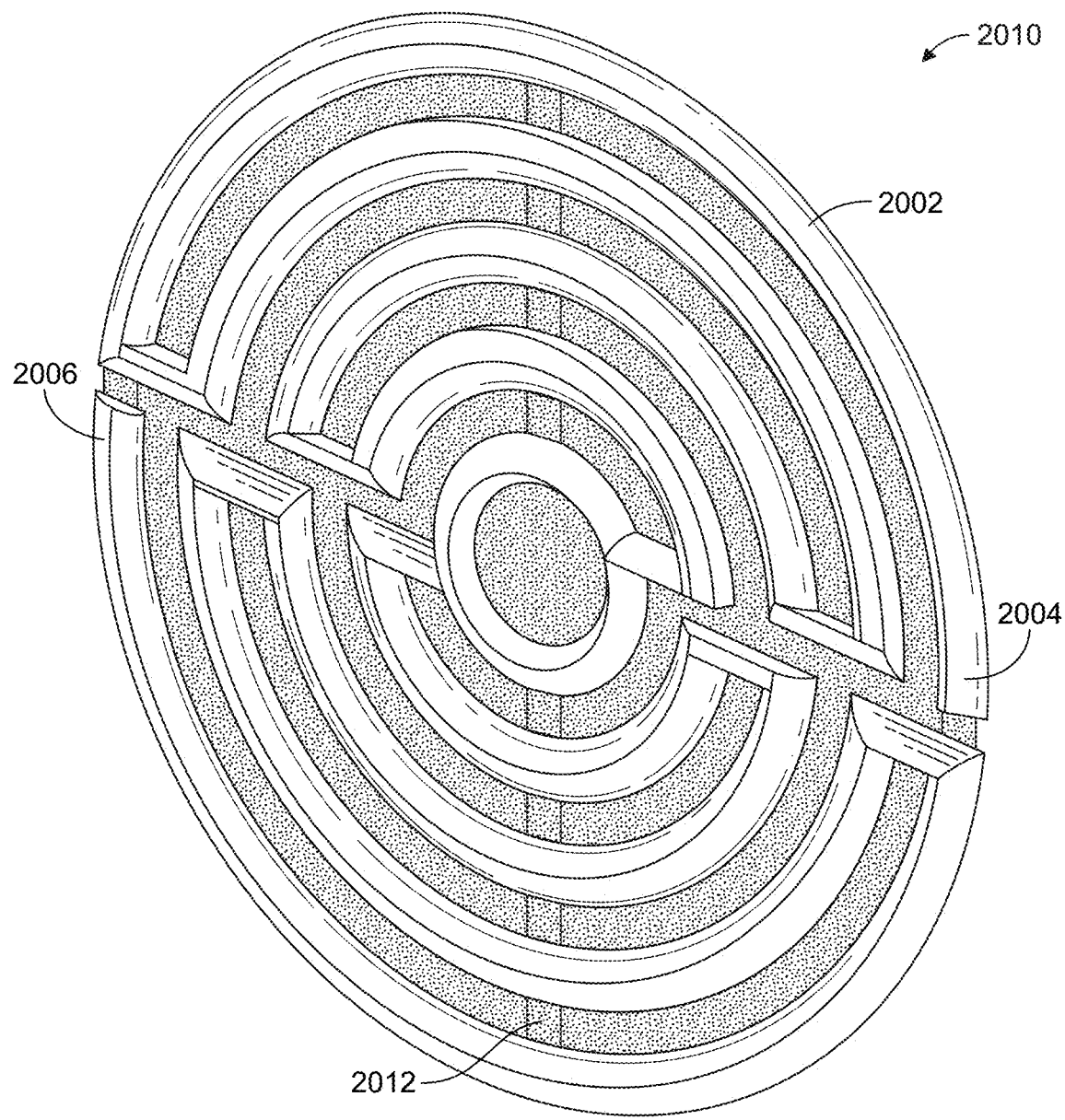

In an embodiment, with reference to FIG. 20, a resistor 2010 includes an elongated body 2002 that extends from a first terminal end 2004 to an opposite second terminal end 2006. The body forms a continuous, non-intersecting path that extends from the first terminal end to the second terminal end and that forms a disc. The body is configured to receive electric current from a powered system at the first terminal end and conduct and provide electric resistance to the electric current received from the powered system to dissipate at least part of the electric current as heat from the body. The resistor may include one or more insulative (non-electrically conducting) portions 2012 that are attached to and lie between the arms or winding parts of the body. The insulative portion(s) do not conduct electricity, such that the body, winding in a tortuous or serpentine manner, extends from one terminal to the other without the arms or winding portions of the body intersecting with other arms or winding portions of the body. In one aspect, the insulative portion(s) and the body are made using an additive manufacturing process (e.g., different materials for the insulative portion(s) and electrically-conductive portion) and are thereby unitary. The insulative portion(s) may be thermally conductive, thereby to help remove heat from the conductive body. The insulative portion(s) may occupy the entirety of the space/spaces between the arms or windings of the body, such that the resistor disc is a solid disc, or solid except for through-holes provided for the passage of a cooling fluid.

In one embodiment, a resistor of a vehicle or other powered system is provided. The resistor includes an elongated cylindrical body having nodes and elongated members. The elongated members interconnect the nodes to form openings between the nodes and the elongated members for the flow therethrough of a cooling fluid. The body is configured to receive electric current from a powered system and to conduct and provide electric resistance to the electric current to dissipate at least part of the electric current as heat from the body. The body also is configured to be coupled with at least one other resistor of the powered system in one or more of a parallel or series arrangement in an electric circuit.

Optionally, the body is a fractal structure defined by the elongated members and the nodes. Optionally, the body is a tube defined by the elongated members and the nodes. The tube has an open interior channel, and the openings between the nodes and the elongated members are fluidly connected to the interior channel. The body may include multiple rows of the openings along a length of the cylindrical body, with each of the rows including multiple of the openings spaced apart around a circumference of the cylindrical body. The body may extend along a center axis from a first terminal end of the body to an opposite second terminal end of the body. The first terminal end is configured to receive the electric current, and the second terminal end is configured to be coupled with the at least one other resistor. Optionally, the elongated members and the nodes form a lattice structure with the elongated members being elongated in multiple different directions in a three-dimensional space. The openings defined between the elongated members and the nodes may be interconnected to enable the cooling fluid to flow through the body via the openings to dissipate the heat from the body. The body may include a ceramic material and/or a metallic material. The powered system, the resistor, and the at least one other resistor may be disposed on a vehicle.

Optionally, the body has an elongated center portion and an elongated outer portion disposed radially outside of the center portion relative to a center axis of the body and surrounding the center portion. The center portion of the body has a different density of the nodes and the elongated members than the outer portion of the body. The elongated members and the nodes of the outer portion are closer together than the elongated members and the nodes of the center portion such that the openings in the outer portion are smaller than the openings in the center portion.

In one embodiment, a method for manufacturing a resistor includes successively applying layers of material on each other. Each of the layers forms a cross-sectional shape of a three-dimensional resistor body. The method also includes fusing adjacent layers of the layers that are successively applied with each other to form the resistor body. The adjacent layers are fused together to form the resistor body that has an elongated cylindrical shape. The adjacent layers are fused together to form the resistor body that is shaped to receive and dissipate electric current from a powered system as heat from the resistor body. The resistor body is shaped to be coupled with at least one other resistor of the powered system in one or more of a parallel or series arrangement in an electric circuit.

Optionally, the layers are successively applied and the adjacent layers are fused together to form the resistor body having define multiple elongated members and nodes. The elongated members interconnect the nodes to form openings therebetween for the flow therethrough of a cooling fluid. The layers may be successively applied and the adjacent layers fused together to form the resistor body as a fractal structure defined by the elongated members and the nodes. The layers may be successively applied and the adjacent layers fused together to form the resistor body having an open interior channel. The openings between the nodes and the elongated members are fluidly connected to the interior channel.

Optionally, the layers are successively applied and the adjacent layers are fused together to form the resistor body as a tube defining an interior channel that extends an entire length of the cylindrical resistor body. A center axis of the cylindrical resistor body extends through the interior channel. Optionally, the layers are successively applied and the adjacent layers are fused together to form the resistor body with an elongated center portion and an elongated outer portion disposed radially outside of the center portion relative to a center axis of the body and surrounding the center portion.

In one embodiment, a resistor includes an elongated cylindrical body that extends along a center axis from a first terminal end to an opposite, second terminal end. The body has elongated members interconnected to one another at nodes and forms openings between the nodes and the elongated members for flow therethrough of a cooling fluid. The body forms a continuous electrically conductive path that extends from the first terminal end to the second terminal end. The body is configured to receive electric current at the first terminal end from a powered system and to conduct and provide electric resistance to the electric current to dissipate at least part of the electric current as heat from the body. The second terminal end of the body is configured to be coupled with at least one other resistor of the powered system in one or more of a parallel or series arrangement in an electric circuit.

Optionally, the body defines an interior channel extending from the first terminal end to the second terminal end and the center axis extends through the interior channel. The openings between the nodes and the elongated members are fluidly connected to the interior channel.

As used herein, an element or step recited in the singular and proceeded with the word "a" or "an" does not exclude plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The above description is illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A resistor comprising:
an elongated cylindrical body that extends along a center axis from a first terminal end to an opposite, second terminal end, the body having elongated members interconnected to one another at nodes to define openings between the nodes and the elongated members for flow therethrough of a cooling fluid, wherein the elongated members and the nodes form a lattice structure with the elongated members being elongated in multiple different directions relative to each other in a three-dimensional space, and at least some of the nodes are located at different radial distances from the center axis,
wherein the body is configured to receive electric current from a powered system and to conduct and provide electric resistance to the electric current to dissipate at least part of the electric current as heat from the body,
wherein the body also is configured to be coupled with at least one other resistor of the powered system in one or more of a parallel or series arrangement in an electric circuit.

2. The resistor of claim 1, wherein the body is a fractal structure defined by the elongated members and the nodes.

3. The resistor of claim 1, wherein the body is a tube defined by the elongated members and the nodes, the tube having an open interior channel, the openings between the nodes and the elongated members fluidly connected to the interior channel.

4. The resistor of claim 1, wherein the body includes multiple rows of the openings along a length of the cylindrical body, each of the rows including multiple of the openings spaced apart around a circumference of the cylindrical body.

5. The resistor of claim 1, wherein the first terminal end of the cylindrical body is configured to receive the electric current and the second terminal end is configured to be coupled with the at least one other resistor.

6. The resistor of claim 1, wherein the openings defined between the elongated members and the nodes are interconnected to enable the cooling fluid to flow through the body via the openings to dissipate the heat from the body.

7. The resistor of claim 1, wherein the body includes one or more of a ceramic material or a metallic material.

8. The resistor of claim 1, wherein the body has an elongated center portion and an elongated outer portion disposed radially outside of the center portion relative to the center axis of the body and surrounding the center portion, the elongated members and the nodes disposed at both the center portion and the outer portion.

9. The resistor of claim 8, wherein the center portion of the body has a different density of the nodes and the elongated members than the outer portion of the body.

10. The resistor of claim 9, wherein the elongated members and the nodes of the outer portion are closer together than the elongated members and the nodes of the center portion such that the openings in the outer portion are smaller than the openings in the center portion.

11. The resistor of claim 1, wherein the powered system, the resistor, and the at least one other resistor are disposed on a vehicle.

12. The resistor of claim 1, wherein the elongated members and the nodes are disposed along an entire length of the cylindrical body from the first terminal end to the second terminal end to provide a continuous electrically conductive path from the first terminal end to the second terminal end through the elongated members and the nodes.

13. A method for manufacturing a resistor, the method comprising:
successively applying layers of material on each other, each of the layers forming a cross-sectional shape of a three-dimensional resistor body; and
fusing adjacent layers of the layers that are successively applied with each other to form the resistor body,
wherein the layers are successively applied and fused to form the resistor body to have an elongated cylindrical shape that extends along a center axis from a first terminal end to an opposite, second terminal end, the resistor body comprised of elongated members interconnected to one another at nodes to define openings between the nodes and the elongated members for flow therethrough of a cooling fluid, wherein the elongated members and the nodes form a lattice structure with the elongated members being elongated in multiple different directions relative to each other in a three-dimensional space, and at least some of the nodes are located at different radial distances from the center axis,
wherein the resistor body is formed to receive electric current from a powered system and to dissipate at least part of the electric current as heat from the resistor body, and the resistor body is formed to be coupled with at least one other resistor of the powered system in one or more of a parallel or series arrangement in an electric circuit.

14. The method of claim 13, wherein the layers are successively applied and the adjacent layers are fused together to form the resistor body as a fractal structure defined by the elongated members and the nodes.

15. The method of claim 13, wherein the layers are successively applied and the adjacent layers are fused together to form the resistor body having an open interior channel, the openings between the nodes and the elongated members fluidly connected to the interior channel.

16. The method of claim 13, wherein the layers are successively applied and the adjacent layers are fused together to form the resistor body as a tube defining an interior channel that extends an entire length of the resistor body, wherein the center axis of the resistor body extends through the interior channel.

17. The method of claim 13, wherein the layers are successively applied and the adjacent layers are fused together to form the resistor body with an elongated center portion and an elongated outer portion disposed radially outside of the center portion relative to the center axis of the body and surrounding the center portion, the elongated members and the nodes disposed at both the center portion and the outer portion.

18. A resistor comprising:

an elongated cylindrical body that extends along a center axis from a first terminal end to an opposite, second terminal end, the body having elongated members interconnected to one another at nodes to define openings between the nodes and the elongated members for flow therethrough of a cooling fluid, the elongated members and the nodes disposed along an entire length of the body from the first terminal end to the second terminal end to provide a continuous electrically conductive path from the first terminal end to the second terminal end through the elongated members and the nodes, wherein the body is configured to receive electric current at the first terminal end from a powered system and to conduct and provide electric resistance to the electric current to dissipate at least part of the electric current as heat from the body, and the second terminal end of the body is configured to be coupled with at least one other resistor of the powered system in one or more of a parallel or series arrangement in an electric circuit.

19. The resistor of claim 18, wherein the body defines an interior channel extending from the first terminal end to the second terminal end and the center axis extends through the interior channel, wherein the openings between the nodes and the elongated members are fluidly connected to the interior channel.

20. The resistor of claim 18, wherein the elongated members and the nodes form a lattice structure with the elongated members being elongated in multiple different directions relative to each other in a three-dimensional space and at least some of the nodes are located at different radial distances from the center axis.

* * * * *